US011057096B2

(12) United States Patent
Noh et al.

(10) Patent No.: US 11,057,096 B2
(45) Date of Patent: *Jul. 6, 2021

(54) METHOD FOR CONFIGURING FEEDBACK INFORMATION TO FEED EXPLICIT CHANNEL STATE INFORMATION BACK IN WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Hoon-Dong Noh, Gyeonggi-do (KR); Sooyong Choi, Seoul (KR); Youngrok Jang, Seoul (KR); Young-Woo Kwak, Gyeonggi-do (KR); Youn-Sun Kim, Gyeonggi-do (KR); Dongheon Lee, Daegu (KR); Seongbae Han, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 0 days.

This patent is subject to a terminal disclaimer.

(21) Appl. No.: 16/681,415

(22) Filed: Nov. 12, 2019

(65) Prior Publication Data

US 2020/0083941 A1 Mar. 12, 2020

Related U.S. Application Data

(63) Continuation of application No. 16/020,536, filed on Jun. 27, 2018, now Pat. No. 10,476,576.

(30) Foreign Application Priority Data

Jun. 27, 2017 (KR) ........................ 10-2017-0081028

(51) Int. Cl.
*H04B 7/06* (2006.01)
*H04L 12/24* (2006.01)
(Continued)

(52) U.S. Cl.
CPC .......... *H04B 7/066* (2013.01); *H04B 7/0626* (2013.01); *H04L 5/0053* (2013.01);
(Continued)

(58) Field of Classification Search
CPC ..... H04L 5/0048; H04L 1/0026; H04L 5/006; H04L 25/0226; H04L 1/20;
(Continued)

(56) References Cited

U.S. PATENT DOCUMENTS 7,203,459 B2 4/2007 Goldstein
7,421,041 B2 9/2008 Khandekar
(Continued)

FOREIGN PATENT DOCUMENTS

KR 10-2016-0129767 11/2016

*Primary Examiner* — Linda Wong
(74) *Attorney, Agent, or Firm* — The Farrell Law Firm, P.C.

(57) ABSTRACT

A method and a terminal for transmitting a feedback signal by a terminal in a wireless communication system are provided. The method includes receiving, from a base station, a feedback information configuration; receiving, from the base station, a reference signal; estimating a channel between the base station and the terminal based on the reference signal; configuring channel component information associated with separating each of a plurality of channel elements of the channel according to components of the plurality of channel elements; configuring grouping information associated with grouping the plurality of channel elements; and transmitting feedback information including the configured channel component information and the configured grouping information.

20 Claims, 10 Drawing Sheets

10

BASE STATION (100)

TERMINAL (200)

120 CONTROL UNIT
121 FEEDBACK INFORMATION CONFIGURING UNIT
123 FEEDBACK INFORMATION COMBINING UNIT
110 WIRELESS COMMUNICATION UNIT
$M_T$
$M_R$
210 WIRELESS COMMUNICATION UNIT
220 CONTROL UNIT
223 FEEDBACK INFORMATION COMBINING UNIT
221 FEEDBACK INFORMATION CONFIGURING UNIT
130 STORAGE UNIT
230 STORAGE UNIT

(51) Int. Cl.
*H04L 5/00* (2006.01)
*H04W 24/10* (2009.01)
*H04W 48/16* (2009.01)

(52) U.S. Cl.
CPC ........... *H04L 41/142* (2013.01); *H04W 48/16* (2013.01); *H04W 24/10* (2013.01)

(58) Field of Classification Search
CPC ............. H04L 25/0228; H04L 25/0202; H04L 25/0206; H04L 25/0224; H04L 27/2646; H04L 1/0073; H04L 25/0204; H04L 27/2601; H04L 5/0023; H04L 25/0391; H04L 25/0222; H04L 27/265; H04L 27/36; H04L 25/03898; H04L 27/2649; H04L 2025/03426; H04L 27/38; H04L 2025/03414; H04L 25/022; H04L 25/03159; H04L 5/00; H04L 2012/2841; H04L 5/023; H04W 72/085; H04W 72/1231; H04W 28/0268; H04W 56/0095; H04W 72/1226; H04W 84/12; H04W 72/046; H04W 72/005; H04W 16/28; H04W 88/02; H04B 7/0417; H04B 7/0632; H04B 7/0626; H04B 7/0619; H04B 7/0658; H04B 17/24; H04B 7/061; H04B 7/0621; H04B 7/0673; H04B 17/318; H04B 17/336; H04B 7/0456; H04B 7/0413; H04B 7/0697; H04B 7/0617; H04B 7/0421; H04B 7/0682; H04B 7/10; H04B 7/0628; H04B 7/0452; H04B 1/06; H04B 7/0891; H04B 1/711; H04J 11/00
See application file for complete search history.

(56) References Cited

U.S. PATENT DOCUMENTS 8,290,068 B2 10/2012 Ko
8,442,449 B2 5/2013 Hui
10,116,371 B2 10/2018 Park
2004/0203465 A1 10/2004 Goldstein
2005/0181736 A1 8/2005 Cao
2005/0190868 A1 9/2005 Khandekar
2006/0003710 A1* 1/2006 Nakagawa .............. H04L 27/20 455/101
2006/0276217 A1 12/2006 Khojastepour
2006/0285606 A1 12/2006 Khojastepour
2007/0174038 A1 7/2007 Wang
2007/0286310 A1 12/2007 Fukuoka
2008/0132282 A1 6/2008 Liu
2009/0060082 A1 3/2009 Yuda
2009/0245401 A1 10/2009 Chrabieh
2009/0275352 A1 11/2009 Kim
2009/0285169 A1 11/2009 Yang
2009/0286474 A1 11/2009 Park
2010/0061259 A1 3/2010 Larsson
2010/0062783 A1 3/2010 Luo
2010/0110982 A1 5/2010 Roh
2010/0227561 A1 9/2010 Chakraborty
2010/0311343 A1 12/2010 Keerthi
2012/0213111 A1* 8/2012 Shimezawa ............... H04L 1/06 370/252
2012/0251110 A1 10/2012 Cvijetic
2013/0044610 A1 2/2013 Zhao
2013/0163645 A1 6/2013 Kuo
2013/0243111 A1 9/2013 Lee
2013/0250793 A1 9/2013 Bhattad
2014/0341311 A1 11/2014 Wang
2014/0369262 A1 12/2014 Roh
2015/0023440 A1 1/2015 Suh
2015/0055630 A1 2/2015 Attar
2015/0071190 A1 3/2015 Lau
2016/0029372 A1 1/2016 Sayana
2016/0043816 A1 2/2016 Wu
2016/0212643 A1 7/2016 Park
2016/0294457 A1 10/2016 Lee
2016/0308590 A1 10/2016 Wang
2016/0323021 A1 11/2016 Chen
2016/0323022 A1 11/2016 Rahman et al.
2016/0323042 A9 11/2016 Shin
2016/0352401 A1 12/2016 Yu
2017/0041058 A1 2/2017 Forenza
2017/0093477 A1 3/2017 Yamaura
2017/0180420 A1 6/2017 Mookiah
2017/0288902 A1 10/2017 Rusek
2017/0373745 A1 12/2017 Park
2018/0035426 A1 2/2018 Barriac
2018/0123837 A1 5/2018 Barbu
2018/0262252 A1 9/2018 Oh
2019/0068259 A1 2/2019 Liu
2019/0141545 A1 5/2019 Dang

* cited by examiner

METHOD FOR CONFIGURING FEEDBACK INFORMATION TO FEED EXPLICIT CHANNEL STATE INFORMATION BACK IN WIRELESS COMMUNICATION SYSTEM

CROSS-REFERENCE TO RELATED APPLICATION

This continuation application claims priority under 35 U.S.C. § 120 to U.S. patent application Ser. No. 16/020,536, filed on Jun. 27, 2018 in the United States Patent and Trademark Office, which is based on and claimed priority under 35 U.S.C. § 119(a) to Korean Patent Application Serial No. 10-2017-0081028, filed on Jun. 27, 2017, in the Korean Intellectual Property Office, the disclosure of each of which is incorporated herein by reference in its entirety.

BACKGROUND

1. Field

The present disclosure relates to a wireless communication system and, more particularly, to a method for configuring feedback information to explicitly feed channel state information (CSI) back in a multiple-input multiple-output (MIMO) system.

2. Description of Related Art

In order to meet wireless data traffic demands that have increased after 4th generation (4G) communication system commercialization, efforts to develop an improved 5th generation (5G) communication system or a pre-5G communication system have been made. For this reason, the 5G communication system or the pre-5G communication system is referred to as a beyond 4G network communication system or a post-LTE system.

In order to achieve a high data transmission rate, an implementation of the 5G communication system in an extremely high frequency (mmWave) band (for example, 60 GHz band) is being considered. In the 5G communication system, technologies such as beamforming, massive MIMO, full dimensional MIMO (FD-MIMO), array antenna, analog beam-forming, and large scale antenna are discussed to mitigate propagation path loss in the extremely high frequency band and increase propagation transmission distance.

Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network.

In addition, the 5G system has developed advanced coding modulation (ACM) schemes such as hybrid frequency shift keying (FSK) and frequency quadrature amplitude modulation (FQAM) and sliding window superposition coding (SWSC), and advanced access technologies such as filter bank multi carrier (FBMC), non-orthogonal multiple access (NOMA), and sparse code multiple access (SCMA).

Recently, a 3rd generation partnership project (3GPP) has established a standard technology for a 5G communication system which is referred to as new radio (NR). In an NR-MIMO system, a base station supports a maximum of 256 antennas. A terminal supports a maximum of 32 antennas in a frequency band of 6 GHz or greater, and a maximum of eight antennas in a frequency band of 6 GHz or less. In addition, in the NR-MIMO system, a frequency efficiency is required to be supported up to a maximum of 30 bps/Hz. Therefore, in order to support the NR-MIMO system, accurate CSI feedback for a high-order channel, and a high-order multiuser MIMO are required.

Implicit CSI feedback based on a codebook is applied to long term evolution (LTE) releases 13 and 14. In implicit CSI feedback, CSI feedback based on a precoding matrix indicator (PMI), a channel quality indicator (CQI), a rank indicator (RI), and a CSI reference signal (CSI-RS) resource indicator (CRI) with reference to the operation of a single user is performed. Implicit CSI feedback accompanies a relatively low feedback overhead, but has low accuracy of channel feedback. Therefore, only restricted operations are possible in precoding and scheduling of a base station for supporting a multiuser technology. Whereas, in explicit CSI feedback, the entire channel matrix between a base station and a terminal, a channel correlation matrix, or the eigenvector of a channel correlation matrix, etc. are fed back, so that a relatively high overhead is accompanied thereby. However, in explicit CSI feedback, channel feedback having high accuracy can be performed. Therefore, high flexibility in precoding and scheduling of a base station can be ensured. In order to provide a high frequency efficiency required for the NR-MIMO system and accurate CSI feedback for a high-order channel, and support a high-order multiuser technology, research on the explicit CSI feedback scheme is required. In addition, various feedback information configuring schemes are required for properly operating a corresponding efficient explicit CSI feedback scheme in a NR-MIMO system.

In order to provide a high frequency efficiency required for a MIMO system and accurate CSI feedback for a high-order channel, and support a high-order multiuser technology, research on explicit CSI feedback scheme is required.

In addition, various feedback information configuring schemes are required for properly operating a corresponding efficient explicit CSI feedback scheme in a MIMO system.

SUMMARY

An aspect of the present disclosure provides a feedback information configuring method in order to operate efficient explicit CSI feedback which can remedy the disadvantage of implicit CSI feedback.

Another aspect of the present disclosure provides, even when a number of channel elements, which a terminal should feed to a base station, becomes large, that explicit CSI can be fed back regardless of the number of channel elements.

Another aspect of the present disclosure provides that, even though implicit CSI feedback in LTE has been required to be operated on the basis of a codebook, explicit CSI feedback can operate regardless of codebooks.

Another aspect of the present disclosure provides that, even though implicit CSI feedback in the LTE, a codebook should be newly defined depending on the dimensions of channel matrixes determined by a random number of base station and terminal antennas, a codebook is not required to be newly defined.

Another aspect of the present disclosure provides that a feedback information configuration is discriminated from a feedback information configuration scheme used in an implicit CSI feedback scheme in LTE, and is variously performed by periodic/aperiodic, wideband (WB)/subband (SB), and the determinations of a base station/terminal, where the feedback information configuration can be flexibly performed to be suitable for an entire system situation of a base station and terminals so as to achieve CSI feedback having a high accuracy.

According to an aspect of the present disclosure, a method for transmitting a feedback signal by a terminal in a wireless communication system is provided. The method includes receiving, from a base station, a feedback information configuration; receiving, from the base station, a reference signal; estimating a channel between the base station and the terminal based on the reference signal; configuring channel component information associated with separating each of a plurality of channel elements of the channel according to components of the plurality of channel elements; configuring grouping information associated with grouping the plurality of channel elements; and transmitting feedback information including the configured channel component information and the configured grouping information.

According to another aspect of the present disclosure, a terminal for transmitting a feedback signal in a wireless communication system is provided. The terminal includes a wireless communication unit configured to transmit and receive data; and a control unit configured to control the terminal, wherein the control unit is further configured to control the wireless communication unit to receive, from a base station, a feedback information configuration; control the wireless communication unit to receive, from the base station, a reference signal; configure channel component information associated with separating each of a plurality of channel elements of the channel according to components of the plurality of channel elements; configure grouping information associated with grouping the plurality of channel elements; and control the wireless communication unit to transmit feedback information including the configured channel component information and the configured grouping information.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1:
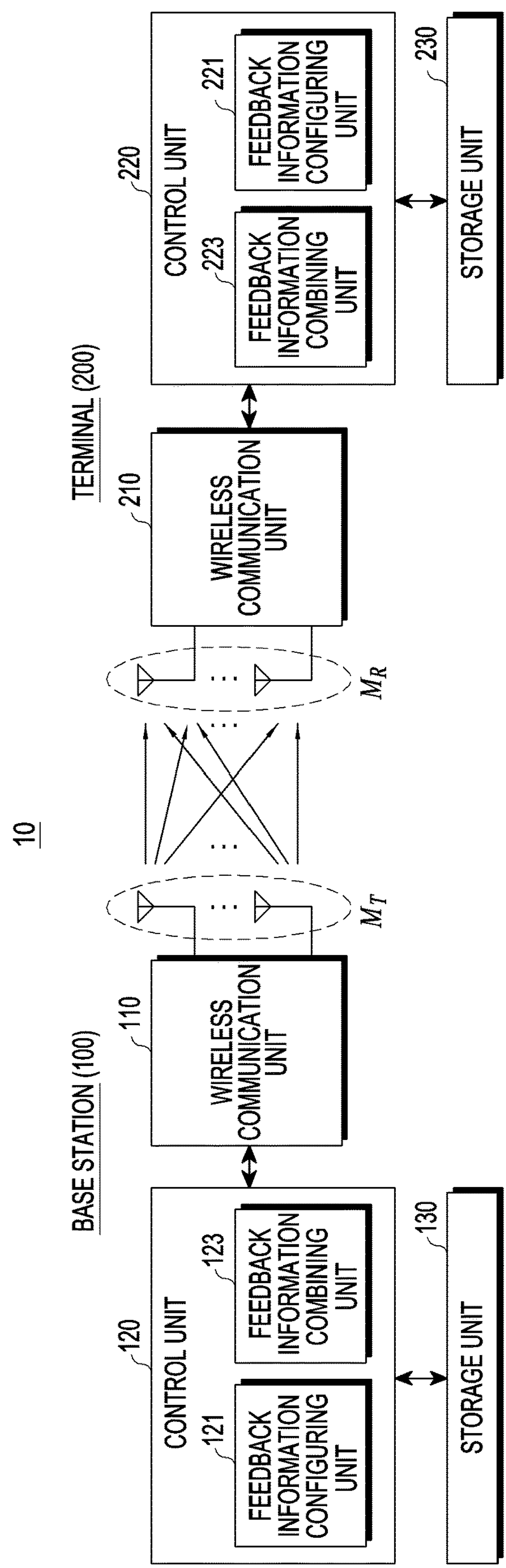
FIG. 1 is a block diagram of a base station and a terminal according to an embodiment.

The following detailed description refers to the accompanying drawings in order to assist in a comprehensive understanding of the present disclosure as defined by the appended claims and equivalents thereof. The following detailed description includes various certain matters for understanding of the same, but the matters are merely an example. Accordingly, those skilled in the art may recognize that various modifications and changes to the various embodiments described herein may be made without departing from the spirit and scope of the present disclosure. Further, descriptions of known functions and elements are omitted for clarity and brevity.

The terms used in the following detailed description and the appended claims are not intended to be limited to their literal meanings, but are simply used to facilitate a clear and consistent understanding of the present disclosure. Therefore, it should be apparent to those skilled in the art that the following description of various embodiments is provided for illustrative purposes only, and is not intended to limit the present disclosure that is defined by the appended claims and equivalents thereof.

Although the terms including an ordinal number such as first, second, etc. may be used for describing various elements, the elements are not restricted by the terms. The terms are used merely for the purpose of distinguishing an element from other elements. For example, a first element may be referred to as a second element, and similarly, a second element may be referred to as a first element without departing from the scope and spirit of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the present disclosure, the terms such as "include" and/or "have" may be construed to denote a certain characteristic, number, step, operation, element, component or a combination thereof, but may not be construed to exclude the existence or possibility of addition one or more other characteristics, numbers, steps, operations, elements, components or combinations thereof.

Unless defined otherwise, all terms used herein have the same meanings as commonly understood by those of skill in the art to which the present disclosure pertains. Such terms as those defined in a generally used dictionary are to be interpreted to have the same meaning as the contextual meaning in the relevant field of art.

A base station communicates with a terminal, and may be referred to as a BS, a node B (NB), an eNode B (eNB), an access point (AP) and the like.

The terminal communicates with the base station, and may be referred to as a user equipment (UE), a mobile station (MS), a mobile equipment (ME), a device, and the like.

As described above, a MIMO system should be able to support a maximum of 256 antennas by a base station, and 32 antennas (the frequency band equal to or greater than 6 GHz) or eight antennas (the frequency band equal to or less than 6 GHz) by a terminal, and support a frequency efficiency up to a maximum of 30 bps/Hz. In this case, an accurate high-order CSI feedback method and a high-order multiuser technology are required to be supported. Since implicit CSI feedback in LTE operates on the basis of a codebook, a codebook suitable for a corresponding channel dimension should be re-defined in order to perform CSI feedback on a channel matrix having the value of the dimension which has not currently been defined. In addition, implicit CSI feedback accompanies low feedback overhead, but has low accuracy and is operated on the basis of a single user. Therefore, when a base station performs precoding and scheduling based on multiuser, the performance is limited.

Therefore, the present disclosure provides a feedback information configuring method which should be defined in order to operate an explicit CSI feedback scheme having a high accuracy on a channel matrix having a random dimension.

In the present disclosure, a channel may be defined by a channel matrix between a base station and a terminal, a channel correlation matrix, the eigenvector of a channel correlation matrix, or a matrix generally referred to as a wireless channel in the wireless communication system.

In the present disclosure, a channel element indicates a number of scalars included in a channel matrix. For example, when there are $M_T$ number of base station antennas and $M_R$ number of terminal antennas, the dimension of a channel matrix between the base station and the terminal may be expressed by $M_T \times M_R$, and $M_T M_R$ number of channel elements exist in the corresponding channel matrix. Hereinafter, the number of channel elements is defined by M, and the value of M is defined to be variable according to a channel to be fed back to the base station.

According to an embodiment, channel elements of a channel matrix are divided into particular channel components in order to arrange the channel elements in an order of the magnitudes thereof. Particularly, each channel element is expressed by a complex number. Therefore, the channel elements may be divided into channel components and thus may each be expressed by a real number value. For example, channel components may include a real number component and an imaginary number component of a channel element, a magnitude component and a phase component of a channel element, a real number component and a phase component of a channel element, or the other components which may represent an original channel element, which is a complex number value, and has a real number value allowing arrangement according to a magnitude order.

According to an embodiment, a defined channel is divided into determined channel components, and channel components are arranged in an order of their magnitudes. A sort order before the arrangement according to a magnitude order is defined as an original sort order.

According to an embodiment, feedback information configuration is defined to configure a particular option for each stage so as to generate a feedback operation and feedback information.

According to an embodiment, a feedback information configuration matter is defined as a matter that should be considered during feedback information configuration for each stage.

According to an embodiment, a feedback operation is defined to perform an operation according to feedback information configuration for each stage and generate feedback information to perform CSI feedback from a terminal to a base station.

An NR system and an LTE system is described below as an example. However, the present disclosure is not limited to a particular system, but may also be applied to other wireless communication systems configured to transmit feedback information.

1. Example of System Model

FIG. 1 is a block diagram of a base station and a terminal according to an embodiment.

Referring to FIG. 1, a downlink transmission system 10 includes a base station 100 having an $M_T$ number of antennas and a terminal 200 having an $M_R$ number of antennas. Although FIG. 1 illustrates one terminal 200, a plurality of terminals may exist. In addition, an embodiment relates to a scheme for, when a plurality of terminals exist, configuring feedback information so as to perform explicit CSI feedback from each of the plurality of terminals to a base station with respect to a channel between the base station and the terminals. Therefore, a feedback information configuring procedure is performed for the base station and each of the terminals.

The base station 100 may include at least one of a wireless communication unit 110, a control unit 120, and a storage unit 130, where the control unit 120 may include at least one of a feedback information configuring unit 121 and a feedback information combining unit 123.

The wireless communication unit 110 is an element configured to transmit a reference signal to the terminal 200 and receive feedback information from the terminal 200.

The feedback information configuring unit 121 may configure feedback information for probability distribution approximation releasing, sort order restoring, and grouping releasing. For example, the feedback information configuring unit 121 may be an element configured to configure feedback information for grouping scheme information; configure feedback information for an original (e.g., an initial) sort order; and configure feedback information with respect to a probability distribution type, a type of a probability distribution representing parameter indicating a corresponding probability distribution, and a scalar quantization range.

The feedback information combining unit 123 may use feedback information to recombine a channel and combine channel components. For example, the feedback information configuring unit 121 may be an element configured to release probability distribution approximation (2.5-1 probability distribution approximation releasing); restore an original sort order of channel elements (2.5-2 sort order restoring); and release grouping of channel elements (2.5-3 grouping releasing).

The terminal 200 may include at least one of a wireless communication unit 210, a control unit 220, and a storage unit 230, where the control unit 220 may include at least one of a feedback information configuring unit 221 and a feedback information combining unit 223. The wireless communication unit 210 is an element configured to receive a reference signal from the base station 100 and transmit explicit feedback to the base station 100.

The feedback information configuring unit 221 of the terminal 200 may configure feedback information for grouping, magnitude order sorting, and probability distribution approximation. For example, the feedback information configuring unit 221 may be an element configured to configure feedback information for grouping scheme information; configure feedback information for an original sort order; and configure feedback information with respect to a type of probability distribution, a type of a probability distribution representing parameter indicating a corresponding probability distribution, and a scalar quantization range.

The feedback information combining unit 223 of the terminal 200 may estimate a channel and divide the components of the estimated channel to generate feedback information. For example, the feedback information generating unit 223 may be an element configured to group channel elements (2.3-1 grouping); arrange channel elements each divided according to components thereof (2.3-2 magnitude order sorting); and approximate the sorted channel elements to a particular probability distribution (2.3-3 probability distribution approximation).

As described above, a channel applying explicit CSI feedback according to an embodiment may be defined by a channel matrix between the base station and the terminal, a channel correlation matrix, an eigenvector of the channel correlation matrix, or a channel collectively referred to in a wireless communication system besides the same. When a base station includes an $M_T$ number of antennas and a terminal includes an $M_R$ number of antennas, the dimensions of a channel matrix between the base station and the terminal, and a channel correlation matrix, an eigenvector of the channel correlation matrix may be indicated by Equations (1), (2), and (3) as follows, respectively.

$$H{:}M_T \times M_R \tag{1}$$

$$R{:}M_T \times M_T \tag{2}$$

$$v{:}M_T \times 1 \tag{3}$$

A channel in each of Equations (1) to (3) above may have channel elements having complex number values. For example, when a channel applying explicit CSI feedback according to an embodiment is defined by a channel matrix between the base station and the terminal, M, which is the number of channel elements, may be defined by Equation (4) as follows.

$$M = M_T \times M_R \tag{4}$$

One operation in an embodiment is sorting channel elements according to an order of the magnitudes thereof. The operation of sorting channel elements in an order of the magnitudes thereof, channel vector h, which is expressed by vectorizing a channel matrix of mathematical formula 1, may be expressed by Equation (5) as follows.

$$h = \mathrm{vec}(H), h = [h_1 h_2 \ldots h_M]^T \tag{5}$$

$h_k$ of Equation (5) above indicates a k-th channel element of the channel vector. The channel vector is configured by a total of M channel elements. However, the procedure of vectorizing a channel matrix and expressing a channel vector as the channel matrix is not a necessary operation for implementing the present disclosure, and is only for convenience of expressing the operation of sorting according to a magnitude order. In an embodiment, when a terminal having multiple antennas takes into consideration of vectorizing a channel matrix in order to discriminate channels for the antennas with the base station, the terminal performs vectorization according to an order of the antennas of the terminal.

2. The Entire Operation Procedure of an Explicit CSI Feedback Scheme

Figure 2:
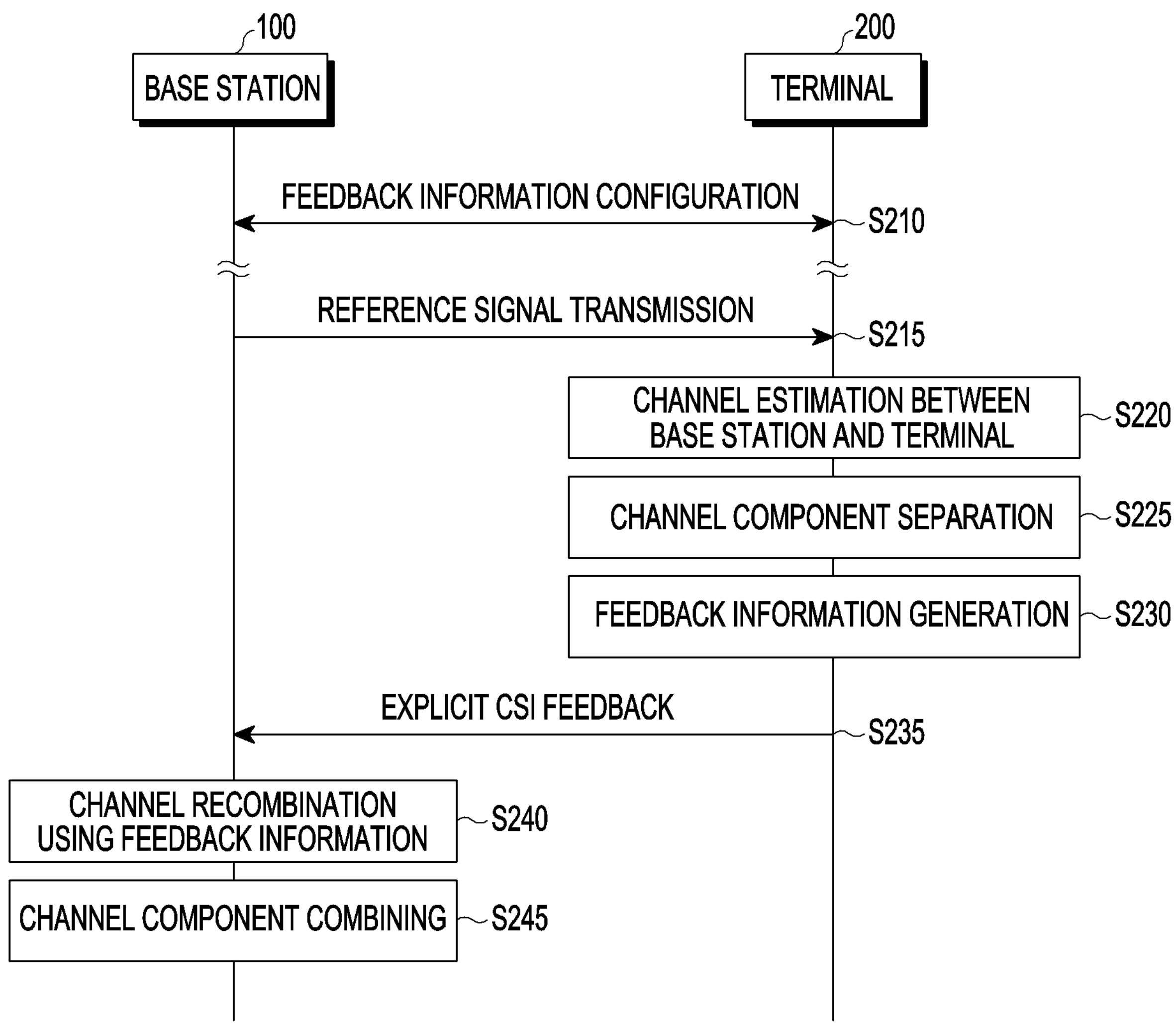
FIG. 2 is a flow diagram showing an operation procedure according to an embodiment.

FIG. 2 is a flow diagram of an operation procedure including an explicit CSI feedback scheme and a feedback information configuring procedure according to an embodiment.

Referring to FIG. 2, the base station 100 and the terminal 200 periodically or aperiodically performs a feedback information configuring procedure in order to operate an explicit CSI feedback scheme at step S210. The feedback information configuring procedure may be performed from the base station 100 to the terminal 200, or from the terminal 200 to the base station 100.

Then, the base station 100 transmits a reference signal to the terminal at step S215.

Then, the terminal 200 estimates a channel between the base station 100 and the terminal 200 at step S220, separates channel components at step S225, and generates feedback information at step S230.

Then, the terminal 200 transmits explicit CSI feedback to the base station 100 at step S235.

Then, the base station 100 recombines the channel by using the feedback information received from the terminal 200 at step S240, and combines the channel components at step S245. As a result from the above mentioned procedure, CSI information between the base station 100 and the terminal 200 may be obtained.

Hereinafter, the detailed description of each of the operations will be given.

2.1 Reference Signal Transmission and Channel Estimation Between Base Station and Terminal at Step S220

The base station 100 transmits a reference signal to allow the terminal 200 to perform channel estimation at step S215. A reference signal may be a beamformed CSI-RS and a non-precoded CSI-RS used in LTE, and may be a reference signal newly defined in the NR-MIMO. For example, a channel vector of Equation (5) above is derived as a result from the channel estimation between the base station 100 and the terminal 200.

2.2 Channel Component Separation at Step S225

After the channel estimation between the base station 100 and the terminal 200, the terminal 200 separates the channel vector into two or more channel components. The separated channel components should be able to express real number values as channel elements, which correspond to complex number values, so as to sort the channel elements according to an order of the magnitudes thereof. For example, when a channel element is divided into a real number component and an imaginary number component according to the channel components thereof, the relation between an original channel element and separated channel components may be expressed by Equation (6) as follows.

$$h_k = h_{r,k} + i h_{i,k} \tag{6}$$

In Equation (6) above, $h_{r,k}$ and $h_{i,k}$ indicate a real number component and an imaginary number component of channel element $h_k$, respectively. Each of the channel elements may be separated into a real number component and an imaginary number component by Equation (6) above, but may be also separated into the magnitude component and the phase component of a corresponding channel element, or the real number component and the phase component thereof. In addition, each of the channel elements may be expressed by a corresponding original channel element, and channel component separation may be performed by other components having real number values in order to arrange the channel elements in an order of the magnitudes thereof. For example, as in Equation (7) below, each of the channel elements may be separated into a magnitude component and a phase component, or as in Equation (8) below, a channel element may be separated into a real number component and a phase component.

$$h_k = |h_k|\exp(<h_k \tag{7}$$

$$h_k = h_{r,k} + ih_{r,k}\tan(<h_k) \tag{8}$$

In Equation (7) above, $|h_k|$ and $\angle h_k$ indicate a magnitude component and a phase component of channel element $h_k$, respectively. In Equation (8) above, $h_{r,k}$ and $\angle h_k$ indicate a real number component and a phase component of channel element $h_k$, respectively. The above mentioned separation of channel components is shown in Table 1 below.

TABLE 1

| Number | The type of separation component | Mathematical formula expression of separation component |
|---|---|---|
| 1 | Real number component/imaginery number component | $h_k = h_{r,k} + ih_{i,k}$ |
| 2 | Magnitude component/phase component | $h_k = \|h_k\|\exp(i\angle h_k)$ |
| 3 | Real number component/phase component | $h_k = h_{r,k} + ih_{r,k}\tan(\angle h_k)$ |
| . . . | In addition to the above schemes 1-3, a separation into two or more channel components satisfying the following conditions is possible. 1) Channel component that can express an original channel element 2) Channel component that can allow arrangement according to an order of magnitudes | |

2.3 Feedback Information Generation at Step S230

After the channel components are separated, the terminal 200 generates feedback information for each of the channel components. The stage of generating feedback information includes grouping, magnitude order sorting, and probability distribution approximation. The three procedures may be performed i) in the order of grouping, magnitude order sorting, and probability distribution approximation, or ii) in the order of magnitude order sorting, grouping, and probability distribution approximation.

Hereinafter, the detailed description of grouping, magnitude order sorting, and probability distribution approximation will be given regardless of performance orders, and then matters that should be considered according to the performance orders will be described.

2.3-1. Grouping

A grouping procedure indicates dividing all of the channel elements into groups including a certain number of channel elements. The grouping procedure may be evenly performed to allow each of the groups to have the same number of channel elements, or may be unevenly performed to allow groups to have different numbers of channel elements.

First, in a case where a grouping procedure is performed to allow a plurality of groups to have an equal number of channel elements, when M number of all of the channel elements are divided into G number of groups each having $M_g$ number of channel elements, Equation (9) as follows represents this case.

$$M = G \times M_g \tag{9}$$

In a case where a grouping procedure is performed to allow a plurality of groups to have different numbers of channel elements, when 1, . . . , G-th groups are configured by $M_1, \ldots, M_G$ numbers of channel elements, respectively, Equation (10) as follows represents this case.

$$M = \sum_{k=1}^{G} M_k \tag{10}$$

When a grouping procedure is performed to allocate unequal numbers of channel elements, grouping procedures allowing each of the groups to have a certain channel element may be applied thereto. For example, in the after-mentioned probability distribution approximation procedure (2.3-3 probability distribution approximation), when channel elements are approximated to a particular probability distribution, grouping may be performed to increase the accuracy on the probability distribution approximation. That is, when all of the channel elements are approximated to a particular probability distribution, only elements having very high accuracies may be selected and grouped to perform a feedback information generating procedure.

Equal or unequal grouping for channel elements may be organized as shown in Table 2 below. Table 2 below shows grouping schemes by using the examples of grouping with respect to real number component $h_r$ of the case where M, which is the number of all of the channel elements, is 6, and each of the channel elements is separated into the real number component and the imaginary number component. $h_r^{(k)}$ of Table 2 below indicates a k-th group.

TABLE 2

| Channel vector before grouping (e.g. M. = 6, grouping for real number component) $h_r = [h_{r,1}\ h_{r,2}\ h_{r,3}\ h_{r,4}\ h_{r,5}\ h_{r,6}]^T$ | | |
|---|---|---|
| The number of channel elements for each group | Number | Formula expression of grouping scheme |
| Equal number scheme | 1 | Grouping for each of 1st-3rd channel elements and 4th-6th channel elements (G = 2, $M_g$ = 3 $h_r \rightarrow h_r^{(1)} = \begin{bmatrix} h_{r,1} \\ h_{r,2} \\ h_{r,3} \end{bmatrix},$ $h_r^{(2)} = \begin{bmatrix} h_{r,4} \\ h_{r,5} \\ h_{r,6} \end{bmatrix}$ |
| | 2 | Grouping for each of (even number)-th channel elements and (odd number)-th channel elements (G = 2, $M_g$ = 3) $h_r \rightarrow h_r^{(1)} = \begin{bmatrix} h_{r,1} \\ h_{r,3} \\ h_{r,5} \end{bmatrix},$ $h_r^{(2)} = \begin{bmatrix} h_{r,2} \\ h_{r,4} \\ h_{r,6} \end{bmatrix}$ |
| | 3 | Grouping for each of 1st-2nd channel elements, 3rd-4th channel elements, and 5th-6th channel elements (G = 3, $M_g$ = 2) $h_r \rightarrow h_r^{(1)} = \begin{bmatrix} h_{r,1} \\ h_{r,2} \end{bmatrix},$ $h_r^{(2)} = \begin{bmatrix} h_{r,3} \\ h_{r,4} \end{bmatrix},$ $h_r^{(3)} = \begin{bmatrix} h_{r,5} \\ h_{r,6} \end{bmatrix},$ |
| | . . . | In addition to the above schemes 1-3, a random scheme having the same number of channel elements for each group can be applied. |
| Unequal number scheme | 1 | (G = 3, $M_1$ = 3, $M_2$ = 2, $M_3$ = 1) $h_r \rightarrow h_r^{(1)} = \begin{bmatrix} h_{r,1} \\ h_{r,2} \\ h_{r,3} \end{bmatrix},$ $h_r^{(2)} = \begin{bmatrix} h_{r,4} \\ h_{r,5} \end{bmatrix},$ $h_r^{(2)} = [h_{r,6}]$ |
| | 2 | (G = 2, $M_1$ = 2, $M_2$ = 4) $h_r \rightarrow h_r^{(1)} = \begin{bmatrix} h_{r,1} \\ h_{r,2} \end{bmatrix},$ $h_r^{(2)} = \begin{bmatrix} h_{r,3} \\ h_{r,4} \\ h_{r,5} \\ h_{r,6} \end{bmatrix}$ |
| | 3 | (G = 3, $M_1$ = 3, $M_2$ = 1, $M_3$ = 2) |

TABLE 2-continued

| Channel vector before grouping (e.g. M. = 6, grouping for real number component) $h_r = [h_{r,1}\ h_{r,2}\ h_{r,3}\ h_{r,4}\ h_{r,5}\ h_{r,6}]^T$ | | |
|---|---|---|
| The number of channel elements for each group | Number | Formula expression of grouping scheme |
| | | $h_r \rightarrow h_r^{(1)} = \begin{bmatrix} h_{r,1} \\ h_{r,3} \\ h_{r,5} \end{bmatrix}$, $h_r^{(2)} = [h_{r,2}]$, $h_r^{(3)} = \begin{bmatrix} h_{r,4} \\ h_{r,6} \end{bmatrix}$ |
| | . . . | In addition to the above schemes 1-3, a random scheme having unequal numbers of channel elements for each group can be applied. |

In Table 2 above, the real number components of a channel vector in which M, which is the number of all of the channel elements, is 6, may be expressed by $h_r=[h_{r,1}\ h_{r,2}\ h_{r,3}\ h_{r,4}\ r_{r,5}\ h_{r,6}]^T$.

A first example of the equal grouping scheme is grouping the real number components of a channel vector into first to third channel elements and fourth to sixth channel elements. That is, the grouping is performed such that the channel vector is divided into two groups (G=2), and each of the groups has three channel elements ($M_g$=3). As a result, as shown in Equation (11) below, channel vector $h_r$ is grouped into a first group $h_r^{(1)}$ and a second group $h_r^{(2)}$.

$$h_r \rightarrow h_r^{(1)} = \begin{bmatrix} h_{r,1} \\ h_{r,3} \\ h_{r,5} \end{bmatrix}, h_r^{(2)} = [h_{r,2}], h_r^{(3)} = \begin{bmatrix} h_{r,4} \\ h_{r,6} \end{bmatrix} \tag{11}$$

A second example of the equal grouping scheme is grouping the real number components of the channel vector into (odd number)-th channel elements and (even-number)-th of channel elements. As the first example, the grouping is performed such that the channel vector is divided into two groups (G=2), and each of the groups has three channel elements ($M_g$=3). As a result, as shown in Equation (12) below, channel vector $h_r$ is grouped into a first group $h_r^{(1)}$ and a second group $h_r^{(2)}$.

$$h_r \rightarrow h_r^{(1)} = \begin{bmatrix} h_{r,1} \\ h_{r,3} \\ h_{r,5} \end{bmatrix}, h_r^{(2)} = \begin{bmatrix} h_{r,2} \\ h_{r,4} \\ h_{r,6} \end{bmatrix} \tag{12}$$

A third example of the equal grouping scheme is grouping the real number components of the channel vector into first and second channel elements, third and fourth channel elements, and fifth and sixth channel elements. That is, the grouping is performed such that the channel vector is divided into three groups (G=3), and each of the groups has two channel elements ($M_g$=2). As a result, as shown in Equation (13) below, channel vector $h_r$ is grouped into a first group $h_r^{(1)}$, a second group $h_r^{(2)}$, and a third group $h_r^{(3)}$.

$$h_r \rightarrow h_r^{(1)} = \begin{bmatrix} h_{r,1} \\ h_{r,2} \end{bmatrix}, h_r^{(2)} = \begin{bmatrix} h_{r,3} \\ h_{r,4} \end{bmatrix}, h_r^{(3)} = \begin{bmatrix} h_{r,5} \\ h_{r,6} \end{bmatrix} \tag{13}$$

In addition to the first to third examples describe above, the equal grouping scheme that allows the same number of channel elements for each of groups may be applied.

A first example of the unequal grouping scheme is grouping such that the channel vector is divided into three groups (G=3), a first group has three channel elements ($M_1$=3), a second group has two channel elements ($M_2$=2), and a third group has one channel element ($M_3$=1). As a result, as shown in Equation (14) below, channel vector $h_r$ is grouped into a first group $h_r^{(1)}$, a second group $h_r^{(2)}$, and a third group $h_r^{(3)}$.

$$h_r \rightarrow h_r^{(1)} = \begin{bmatrix} h_{r,1} \\ h_{r,2} \\ h_{r,3} \end{bmatrix}, h_r^{(2)} = \begin{bmatrix} h_{r,4} \\ h_{r,5} \end{bmatrix}, h_r^{(2)} = [h_{r,6}] \tag{14}$$

A second example of the unequal grouping scheme is grouping such that the channel vector is divided into two groups (G=2), a first group has two channel elements ($M_1$=2), and a second group has four channel elements ($M_2$=4). As a result, as shown in Equation (15) below, channel vector $h_r$ is grouped into a first group $h_r^{(1)}$ and a second group $h_r^{(2)}$.

$$h_r \rightarrow h_r^{(1)} = \begin{bmatrix} h_{r,1} \\ h_{r,2} \end{bmatrix}, h_r^{(2)} = \begin{bmatrix} h_{r,3} \\ h_{r,4} \\ h_{r,5} \\ h_{r,6} \end{bmatrix} \tag{15}$$

A third example of the unequal grouping scheme is grouping such that the channel vector is divided into three groups (G=3), a first group has three channel elements ($M_1$=3), a second group has one channel element ($M_2$=1), and a third group has two channel elements ($M_3$=2). As a result, as shown in Equation (16) below, channel vector $h_r$ is grouped into a first group $h_r^{(1)}$, a second group $h_r^{(2)}$, and a third group $h_r^{(3)}$.

$$h_r \rightarrow h_r^{(1)} = \begin{bmatrix} h_{r,1} \\ h_{r,3} \\ h_{r,5} \end{bmatrix},\ h_r^{(2)} = [h_{r,2}],\ h_r^{(3)} = \begin{bmatrix} h_{r,4} \\ h_{r,6} \end{bmatrix} \tag{16}$$

In addition, the above described grouping procedure is not necessary in the explicit CSI feedback method according to an embodiment, and may be selectively used to reduce an overhead. In addition, as described above, a grouping procedure may be applied to increase accuracy in the after-mentioned probability distribution approximation procedure.

Operations of the present disclosure are performed for all of the channel elements before the grouping procedure, and operations of the present disclosure are performed for channel elements for each of the groups after the grouping procedure. Therefore, when a grouping procedure is performed prior to a magnitude order sorting procedure and a probability distribution approximation procedure (that is, grouping→magnitude order sorting→probability distribution approximation), the grouping procedure is performed for all of the channel elements, and each of a magnitude order sorting procedure and a probability distribution approximation procedure is applied to channel elements for each of the groups. Therefore, when a grouping procedure is performed after magnitude order sorting (that is, magnitude order sorting→grouping→probability distribution approximation), the magnitude order sorting is performed for all of the channel elements, the grouping procedure is performed for all of the channel elements sorted according to an order of the magnitudes thereof, and a probability distribution approximation procedure is applied to channel elements for each of the groups.

2.3-2. Magnitude Order Sorting

A magnitude order sorting procedure is sorting channel elements for each of separated channel components according to the ascending order or the descending order of the magnitudes of the channel elements. Equation (17) below shows, when the number of all channel elements is 8 (M=8), a vector $\bar{h}_r$ indicating the real number components of original channel elements, a vector $h_r$ in which sorting is performed in the ascending order, a vector $s_r$ indicating an original sort order, and a vector $\bar{s}_r$ indicating a modified sort order of the case where sorting is performed in the ascending order.

$$h_r = \begin{bmatrix} -0.0636 \\ 0.0858 \\ -0.5642 \\ -1.3464 \\ 0.6865 \\ -0.2752 \\ 0.0085 \\ -2.1351 \end{bmatrix},\ s_r = \begin{bmatrix} 5 \\ 7 \\ 3 \\ 2 \\ 8 \\ 4 \\ 6 \\ 1 \end{bmatrix} \rightarrow \bar{h}_r = \begin{bmatrix} -2.1351 \\ -1.3464 \\ -0.5642 \\ -0.2752 \\ -0.0636 \\ 0.0085 \\ 0.0858 \\ 0.6865 \end{bmatrix},\ \bar{s}_r = \begin{bmatrix} 1 \\ 2 \\ 3 \\ 4 \\ 5 \\ 6 \\ 7 \\ 8 \end{bmatrix} \tag{17}$$

In Equation (17) above, $h_r$ is sorted in the ascending order through a magnitude order sorting procedure. When the base station 100 restores an original channel after the terminal 200 transmits feedback on the channel to the base station 100, the information of a vector $s_r$ indicating an original sort order is required.

A magnitude order sorting procedure may have different operations depending on a feedback information generating order, in the same manner as the grouping procedure. For example, when feedback information is generated in the order of grouping, magnitude order sorting, and probability distribution approximation, the magnitude order sorting procedure is applied for each of the groups. Therefore, an original sort order is required for each of the groups. In addition, when feedback information is generated in the order of magnitude order sorting, grouping, and probability distribution approximation, the magnitude order sorting procedure is applied to all of the channel elements. Therefore, an original sort order is required for all of the channel elements.

2.3-3. Probability Distribution Approximation

A probability distribution approximation procedure is a procedure of approximating channel elements, which has been sorted in an order of the magnitudes thereof, to a certain probability distribution to generate feedback information so as to allow the base station 100 to restore a channel. According to an embodiment, a probability distribution, to which channel elements may be approximated, and parameters, which may represent a corresponding probability distribution, may be generated as feedback information, differently from the CSI feedback schemes of feeding a channel element value back as it is. A probability density function is a function of outputting a probability value for an input value. Using the characteristics of the probability density function, the terminal 200 may generate feedback information and the base station 100 may perform a channel restoring procedure. Table 3 below shows the explanation of a probability distribution approximation scheme. In table 3, exp(x) means an exponential function, and Q(x) means a cumulative density function of a standard normal distribution.

TABLE 3

| Number | Probability distribution | Formula of cumulative density function | Parameter representing probability distribution |
|---|---|---|---|
| 1 | Uniform distribution | $f_X(x) = \begin{cases} \frac{x-a}{b-a} & x \in [a, b] \\ 0 & \text{otherwise} \end{cases}$ | 1) The minimum value and the maximum value (a, b) 2) The maximum value and the mean value of the difference (b, (b-a)/M) 3) The minimum value and the mean value of the difference (a, (b-a)/M). 4) In addition to 1)-3), two or more expression parameters, which can represent the uniform distribution, are possible to use. |
| 2 | Normal distribution | $F_X(x) = 1 - Q\left(\frac{x-\mu}{\sigma}\right)$ | The mean and the standard deviation (μ, σ) |
| 3 | Rayleigh distribution | $F_X(x) = 1 - \exp\left(-\frac{x^2}{2\sigma^2}\right)$ | A parameter (σ) |
| . . . | In addition to the above schemes 1-3, various probability distributions, to which original channel elements may be approximated, may be utilized. | | |

In Table 3 above, in a case of a uniform distribution, a cumulative density function is expressed as Equation (18) below. As a probability distribution representing parameter, i) the minimum value and the maximum value (a, b), ii) the maximum value and the mean value of the difference (b, (b−a)/M), iii) the minimum value and the mean value of the difference (a, (b−a)/M), and iv) in addition to i)-iii), two or more expression parameters, which may represent the uniform distribution, may be used.

$$f_X(x) = \begin{cases} \frac{x-a}{b-a} & x \in [a, b] \\ 0 & \text{otherwise} \end{cases} \tag{18}$$

In a case of a normal distribution, a cumulative density function is expressed as Equation (19) below, and the mean (μ) and the standard deviation (σ) can be used as a probability distribution representing parameter.

$$F_X(x) = 1 - Q\left(\frac{x-\mu}{\sigma}\right) \tag{19}$$

In a case of a Rayleigh distribution, a cumulative density function is expressed as Equation (20) below, and a parameter (σ) can be used as a probability distribution representing parameter.

$$F_X(x) = 1 - \exp\left(-\frac{x^2}{2\sigma^2}\right) \tag{20}$$

A probability distribution approximation procedure is performed for each of the groups. Therefore, the same probability distribution approximation may be performed for each of the groups, or different probability distribution approximations may be performed for the groups, respectively. When the same probability distribution approximation is performed for each of the groups, i) a probability distribution representing parameter may be individually generated for each of the groups and then fed back, and ii) after probability distribution representing parameters are individually generated for the groups, the mean value of the probability distribution representing parameters may be fed back as a probability distribution representing parameter for all of the groups.

Table 4 below shows a probability distribution approximation scheme for each of the groups. In Table 4 below, channel elements are grouped into G number of groups for real number components thereof, a normal distribution is used as the probability distribution thereof, and a mean and a standard deviation are used as a probability distribution representing parameter.

TABLE 4

| Scheme for each group | Number | Scheme of generating probability distribution representing parameter |
|---|---|---|
| Using the same type of probability distribution for each of groups | 1 | Generating of individual probability distribution representing parameter for each of groups $h_r^{(1)}$ $h_r^{(2)}$ … $h_r^{(G)}$ ↓ ↓ … ↓ $\mu_{r,1}, \sigma_{r,1}$ $\mu_{r,2}, \sigma_{r,2}$ $\mu_{r,G}, \sigma_{r,G}$ In mathematical formula 21, $\mu_{r,k}$, $\sigma_{r,k}$ are a mean and a standard deviation, respectively, and indicate probability distribution representing parameters |

TABLE 4-continued

| Scheme for each group | Number | Scheme of generating probability distribution representing parameter |
|---|---|---|
| | 2 | Using the mean value of the probability distribution representing parameters generated for groups, respectively $\bar{\mu}_r = \frac{1}{G}\sum_{k=1}^{G}\mu_{r,k}$, $\bar{\sigma}_r = \frac{1}{G}\sum_{k=1}^{G}\sigma_{r,k}$ |
| | 3 | Using the mean value of the parameters of groups, which have similar parameter values among probability distribution representing parameters generated for groups $G = \{1, \ldots, G\}, G = \bigcup_{q=1}^{Q} G^{(q)}$ $\bar{\mu}_{r,(q)} = \frac{1}{\lvert G^{(q)}\rvert}\sum_{k\in G^{(q)}}\mu_{r,k}$, $\bar{\sigma}_{r,(q)} = \frac{1}{\lvert G^{(q)}\rvert}\sum_{k\in G^{(q)}}\sigma_{r,k}$ When G is defined by a set having the indices of all groups, $G^{(q)}$ indicates a q-th set among Q sets each having groups which have similar probability distribution representing parameters. $\lvert G^{(q)}\rvert$ indicates the number of the elements in the set $G^{(q)}$. In addition to the above 1-3, a random scheme of generating a probability distribution representing parameter for each of groups in the same probability distribution approximation scheme for each of the groups are possible. |
| Using different types of probability distribution for groups | | Generating of individual probability distribution representing parameter for each of groups |
| Using the same type of probability distribution for some groups | | The schemes used when the same type of probability distribution is used for all the groups may be applied to groups using the same type of probability distribution among all the groups. |

In Table 4 above, in a first example of the case where the same type of probability distribution is used for each of groups, an individual probability distribution representing parameter for each of groups may be generated as in Equation (21) as follows.

$$\begin{array}{ccc} h_r^{(1)} & h_r^{(2)} & h_r^{(G)} \\ \downarrow & \downarrow & \downarrow \\ \mu_{r,1},\sigma_{r,1} & \mu_{r,2},\sigma_{r,2} & \mu_{r,G},\sigma_{r,G} \end{array} \tag{21}$$

In Equation (21) above, $\mu_{r,k}$ is the mean of a k-th group, and $\sigma_{r,k}$ is the standard deviation of a k-th group.

A second example is a case where the same type of probability distribution is used for each of the groups, and the mean value of probability distribution representing parameters generated for the groups is derived from Equation (22) below and then used.

$$\bar{\mu}_r = \frac{1}{G}\sum_{k=1}^{G}\mu_{r,k},\ \bar{\sigma}_r = \frac{1}{G}\sum_{k=1}^{G}\sigma_{r,k} \tag{22}$$

A third example corresponds to a case where the same type of probability distribution is used for each of the groups, and the mean value of parameters of the groups, which have similar parameter values among probability distribution representing parameters generated for the groups, is derived from Equations (23) and (24) below and then used.

$$G=\{1, \ldots, G\}, G=\cup_{q=1}^{Q}G^{(q)} \tag{23}$$

When G indicates a set having the indices of all of the groups, $G^{(q)}$ indicates a q-th set among Q sets each having the groups which have similar probability distribution representing parameters.

$$\bar{\mu}_{r,(q)} = \frac{1}{\lvert G^{(q)}\rvert}\sum_{k\in G^{(q)}}\mu_{r,k},\ \bar{\sigma}_{r,(q)} = \frac{1}{\lvert G^{(q)}\rvert}\sum_{k\in G^{(q)}}\sigma_{r,k} \tag{24}$$

$|G^{(q)}|$ indicates the number of elements in the set $G^{(q)}$.

In addition to the first to third examples, a random scheme of generating a probability distribution representing parameter for each of the groups is possible when the same type of probability distribution is used for each of the groups.

When different types of probability distribution are used for the groups, an individual probability distribution representing parameter is generated for each of the groups. In addition, when the same type of probability distribution is used for some of the groups, the schemes used when the same type of probability distribution is used for all of the groups may be applied to groups using the same type of probability distribution among all of the groups.

In addition, in the above described probability distribution approximation procedure, an embodiment may use a probability distribution wherein accuracy may be increased when the base station performs channel restoration for a feedback channel, the number of parameters, which may represent the corresponding probability distribution, is small, and the range of a value, which each of parameters may have, is limited.

2.4 Feedback Information Transmission From Terminal to Base Station at Step S235

Feedback information is generated as shown in Table 5 below through each of the channel component separating stage and three procedures (grouping, magnitude order sorting, and probability distribution approximation) in the feedback information generating stage, as described above.

TABLE 5

| Feedback information generated for each of procedures | | Features and feedback overhead |
|---|---|---|
| Channel component separation | Separation scheme information (channel component separation method information) | [Selective Feedback] Default value: Real number component/imaginary number component<br>Feedback overhead is determined according the number of defined separation scheme types (the number of separation schemes, and the number of channel components for each of separation schemes) |
| Grouping | Grouping scheme information (grouping method information) | [Selective Feedback] Default value: Grouping scheme is not configured<br>Feedback overhead is determined according to the number of defined grouping schemes. |
| Magnitude order sorting | Original sort order | [Feedback]<br>(1) Grouping → Magnitude order sorting → Probability distribution approximation<br>An original sort order is individually fed back for each of groups<br>Feedback overhead that can represent the number of all of the cases of the permutations generable by using 1, 2, . . . , $M_g$ for each of groups is required<br>Feedback overhead: $cG\lceil \log_2(M_g!) \rceil$<br>(c: The number of separation channel components, G: The number of groups, and $M_g$: The number of channel elements for a group)<br>(2) Magnitude order sorting → Grouping → Probability distribution approximation<br>An original sort order for all of the channel elements is fed back.<br>Feedback overhead that can represent the number of all of the cases of the permutations generable by using 1, 2, . . . , M is required<br>Feedback overhead: $c\lceil \log_2(M!) \rceil$<br>(c: The number of separation channel components, and M.: The number of all of the channel elements) |
| Probability distribution approximation | Probability distribution type information | [Selective Feedback]<br>Default value: All groups use the same type of probability distribution, normal distribution<br>Feedback overhead is determined according to defined grouping schemes, the number of probability distribution types, and probability distribution approximation schemes for groups. |
| | Probability distribution representing parameter (probability distribution parameter information) | [Feedback]<br>Default value: All groups use the same type of probability distribution (Scheme 1. Individually generating a probability distribution representing parameter for each of groups), a mean and a standard deviation in normal distribution.<br>Feedback overhead is determined according to defined grouping schemes, the number of probability distribution types, probability distribution approximation schemes for groups, and the number of probability distribution representing parameters.<br>Feedback is performed after scalar quantization is performed on a probability distribution representing parameters for groups<br>(1) The same number of bits are allocated for each of |

TABLE 5-continued

| Feedback information generated for each of procedures | Features and feedback overhead |
| --- | --- |
| | probability distribution representing parameters.<br>Feedback overhead: cGKn<br>(c: The number of separation channel components, G: The number of groups, K.: The number of feedback bits for a probability distribution representing parameter, and n: The number of probability distribution representing parameters)<br>(2) Different numbers of bits are allocated for probability distribution representing parameters, respectively.<br>Feedback overhead: $cG(K_1 + \ldots + K_n)$<br>(c: The number of separation channel components, G: The number of groups, $K_k$:: The number of feedback bits of a k-th probability distribution representing parameter, and n: The number of probability distribution representing parameters) |

In Table 5 above, the pieces of feedback information corresponding to a selective feedback may use corresponding information configured as a default value in the system, and may include the corresponding information only when the corresponding information is required to be changed for a particular reason. The pieces of feedback information corresponding to feedback except for the selective feedback indicates feedback information required when explicit CSI feedback according to an embodiment is performed. The configuration for the pieces of feedback information corresponding to the selective feedback may be changed by the after-described feedback information configuring scheme, and the pieces of feedback information corresponding to necessary feedback are fed back from a terminal to the base station by a feedback operation scheme.

For example, in Table 5 above, separation scheme information may be generated as feedback information with respect to channel component separation. For example, as the channel component separation scheme 1 of Table 1 above, the scheme of separating channel components into a real number component and an imaginary number component may be configured as a default value, and separation scheme information may be fed back only when a scheme different therefrom is used. The feedback overhead of separation scheme information is determined according to the number of defined separation scheme types (the number of separation schemes and the number of channel components for each of separation schemes).

In addition, grouping scheme information may be generated as feedback information with respect to grouping. For example, the equal grouping scheme 1 of Table 2 above may be configured as a default value and, only when a scheme different therefrom is used, grouping scheme information may be fed back. The feedback overhead of grouping scheme information may be determined according to the number of defined grouping schemes.

In relation to magnitude order sorting, an original sort order is generated as necessary feedback information. When feedback information is generated in the order of grouping, magnitude order sorting, and probability distribution approximation, an original sort order is individually fed back for each of groups. Therefore, feedback overhead that can represent the number of all of the cases of the permutations generable by using 1, 2, . . . , M for each of groups is required That is, in the case of the number c of separation channel components, the number G of groups, and the number $M_g$ of channel elements for a group, the feedback overhead of $cG\lceil \log_2(M_g!)\rceil$ is required. In contrast, when feedback information is generated in the order of magnitude order sorting, grouping, and probability distribution approximation, an original sort order for all of the channel elements is fed back. Therefore, feedback overhead that can represent the number of all of the cases of the permutations generable by using 1, 2, . . . , M is required That is, in a case of the number c of separation channel components, and the number M of all the channel elements, the feedback overhead of $cG\lceil \log_2(M!)\rceil$ is required.

In addition, with respect to probability distribution approximation, probability distribution type information is selectively fed back, and a probability distribution representing parameter may be necessarily fed back. For example, the scheme in which all the groups identically use standard normal distribution may be configured as a default value of probability distribution type information, and probability distribution type information may be fed back only when a scheme different therefrom is used. The feedback overhead of probability distribution type information is determined according to defined grouping schemes, the number of probability distribution types, and probability distribution approximation schemes for groups. When probability distribution type information is configured as a default value and the scheme 1 of Table 4 above of using the same type of probability distribution for each of groups (i.e. generating an individual probability distribution representing parameter for each of groups) is used, a probability distribution representing parameter corresponds to a mean and a standard deviation of the standard normal distribution identically used in all the groups. The feedback overhead of a probability distribution representing parameter is determined according to defined grouping schemes, the number of probability distribution types, probability distribution approximation schemes for groups, and the number of probability distribution representing parameters. In addition, probability distribution representing parameters may be scalar-quantized for each of groups, and the scalar quantized parameters may be fed back. When the same number of bits are allocated for each of probability distribution representing parameters, the feedback overhead is cGKn, wherein c is the number of separation channel components, G is the number of groups, K is the number of feedback bits for a probability distribution representing parameter, and n is the number of probability distribution representing parameters. When different numbers of bits are allocated for probability distribution representing parameters, the feedback overhead is $cG(K_1 + \ldots + K_n)$, wherein c is the number of separation channel components, G is the number of groups, $K_k$ is the number of feedback bits of a k-th probability distribution representing parameter, and n is the number of probability distribution representing parameters.

TABLE 6

| | |
|---|---|
| (When default value configuration is used) Feedback overhead | (1) Grouping → Magnitude order sorting → Probability distribution approximation<br>(1-1) The same number of bits are allocated for each of probability distribution representing parameters.<br>$cGKn + cG\lceil \log_2(M_g!) \rceil$<br>(1-2) Different numbers of bits are allocated for probability distribution representing parameters, respectively.<br>$cG(K_1 + \ldots + K_n) + cG\lceil \log_2(M_g!) \rceil$<br>(2) Magnitude order sorting → Grouping → Probability distribution approximation<br>(2-1) The same number of bits are allocated for each of probability distribution representing parameters.<br>$cGKn + c\lceil \log_2(M!) \rceil$<br>(2-2) Different numbers of bits are allocated for probability distribution representing parameters, respectively.<br>$cG(K_1 + \ldots + K_n) + c\lceil \log_2(M!) \rceil$ |

With respect to a necessary overhead, when feedback information is generated in the order of grouping, magnitude order sorting, and probability distribution approximation, the feedback overhead under the condition that the same number of bits are allocated for each of probability distribution representing parameters is shown in Equation (25) as follows.

$$cGKn+cG\lceil \log_2(M_g!) \rceil \quad (25)$$

When feedback information is generated in the order of grouping, magnitude order sorting, and probability distribution approximation, a feedback overhead under the condition that different numbers of bits are allocated for probability distribution representing parameters, respectively, is shown in Equation (26) as follows.

$$cG(K_1+\ldots+K_n)+cG\lceil \log_2(M_g!) \rceil \quad (25)$$

When feedback information is generated in the order of magnitude order sorting, grouping, and probability distribution approximation, a feedback overhead under the condition that the same number of bits are allocated for each of probability distribution representing parameters is shown in Equation (27) as follows.

$$cGKn+c\lceil \log_2(M!) \rceil \quad (27)$$

When feedback information is generated in the order of magnitude order sorting, grouping, and probability distribution approximation, a feedback overhead under the condition that different numbers of bits are allocated for probability distribution representing parameters, respectively, is shown in Equation (28) as follows.

$$cG(K_1+\ldots+K_n)+c\lceil \log_2(M!) \rceil \quad (28)$$

Feedback information generated in the present embodiment may be generated by autonomous calculating of the feedback information generating unit 223 of FIG. 1, or may be used by retrieving a value stored in the storage unit 230 of FIG. 1. Feedback information configured in the present embodiment may be changed in the feedback information configuring units 121 and 221 of FIG. 1, and the operation of the change may periodically or aperiodically occur in the base station 100 or the terminal 200. Hereinafter, a feedback information configuring scheme and a feedback operation scheme is described in greater detail.

2.5 Channel Recombination Using Feedback Information at Step S240

The terminal 200 transmits pieces of feedback information generated through the feedback information generating procedure to the base station 100. The base station 100 restores a channel between the base station 100 and the terminal 200 by performing a channel recombining procedure and a channel component combining procedure by using the pieces of feedback information received from the terminal 200. Combining of feedback information is performed in the reverse order of the respective operations in a feedback information generating order. That is, combining of feedback information is performed in the order of i) probability distribution approximation releasing, sort order restoring, and grouping release, or in the order of ii) probability distribution approximation releasing, grouping release, and sort order restoring. As the way in feedback information generating was described above, the basic concept of each of the procedures of probability distribution approximation releasing, sort order restoring, and grouping releasing will be first given in greater detail regardless of feedback information combining order, and then matters that should be considered when the above two feedback information combining orders is applied is given in the following description.

2.5-1. Probability Distribution Approximation Releasing

In a probability distribution approximation releasing procedure, the base station 100 generates an approximation channel by using probability distribution representing parameters fed back from the terminal 200. Table 7 below shows probability distribution approximation releasing schemes.

TABLE 7

| Number | Probability distribution approximation releasing scheme | The description of a corresponding scheme |
|---|---|---|
| 1 | Random variable generating scheme | A random variable is generated by using the type of used probability distribution and a probability distribution representing parameter fed back from the terminal, and as |

TABLE 7-continued

| Number | Probability distribution approximation releasing scheme | The description of a corresponding scheme |
|---|---|---|
| | | many random values are generated as the number of channel elements in a group for each of groups. |
| 2 | Cumulative density function using scheme | The type of used probability distribution and a probability distribution representing parameter fed back from the terminal are used to generate a cumulative density function having corresponding probability distribution and then generate the inverse function of the generated function. |
| 3 | Probability density function using scheme | The type of used probability distribution and a probability distribution representing parameter fed back from the terminal are used to generate a probability density function having corresponding probability distribution and then generate the inverse function of the generated function. |

In Table 7 above, in the random variable generating scheme, the base station generates a random variable by using the type of used probability distribution and a probability distribution representing parameter fed back from the terminal and generates as many random values as the number of channel elements in a group for each of groups. Then, the base station arranges generated random values in an order of the magnitudes thereof to generate an approximation channel.

In the cumulative density function using scheme, the base station uses the type of used probability distribution and a probability distribution representing parameter fed back from the terminal to generate a cumulative density function having the corresponding probability distribution and then generate the inverse function of the generated function.

Figure 3:
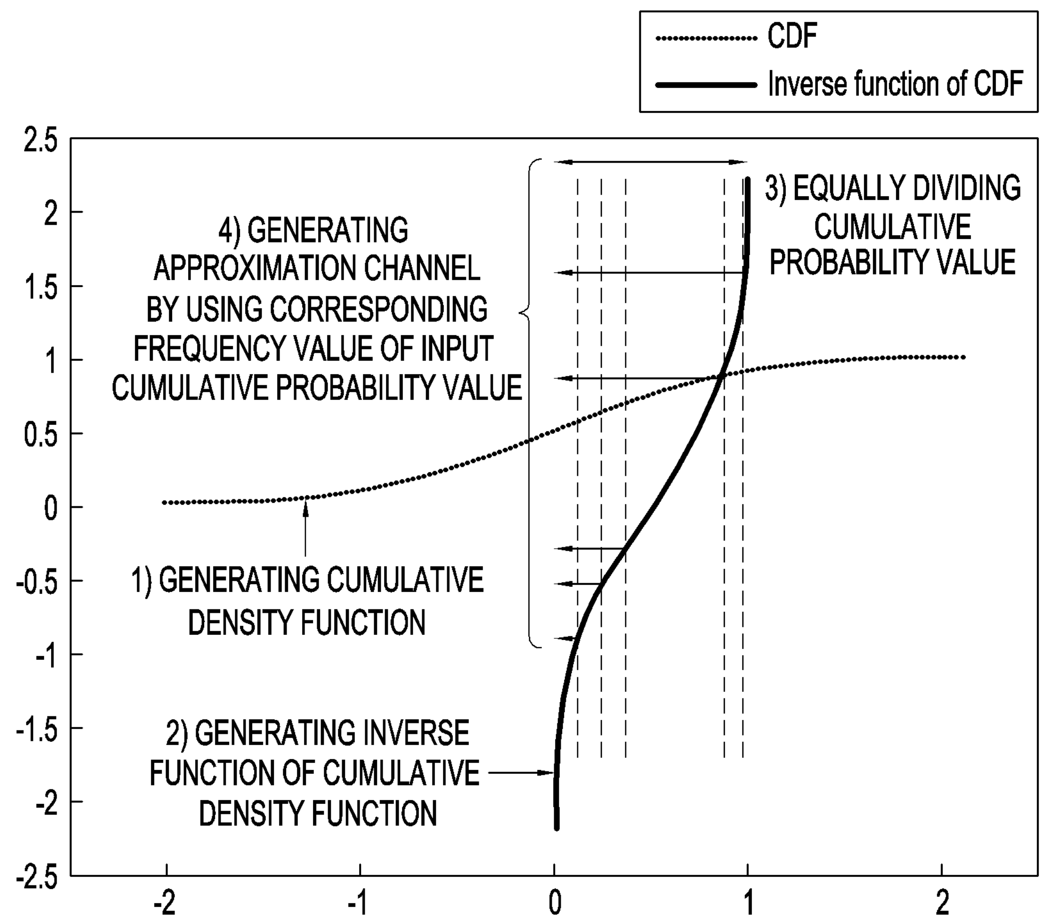
FIGS. 3 and 4 are diagrams showing a procedure of generating an approximation channel, according to an embodiment.

FIG. 3 is a graph showing a procedure of generating an approximation channel by using a cumulative density function using scheme when standard normal distribution is used, according to an embodiment.

Referring to FIG. 3, a cumulative density function is the function in which the x-axis indicates a frequency and the y-axis indicates a cumulative probability value between 0 and 1. Therefore, an inverse function of a cumulative density function is a function in which the x-axis indicates a cumulative probability value and the y-axis indicates a frequency. When the interval of the cumulative probability values from 0 to 1 is evenly divided by the number of channel elements in each of the groups and a corresponding value from the division is input to the inverse function of the cumulative density function, a frequency value corresponding thereto may be obtained, and frequency values obtained therethrough are used as an approximation channel value.

Figure 4:
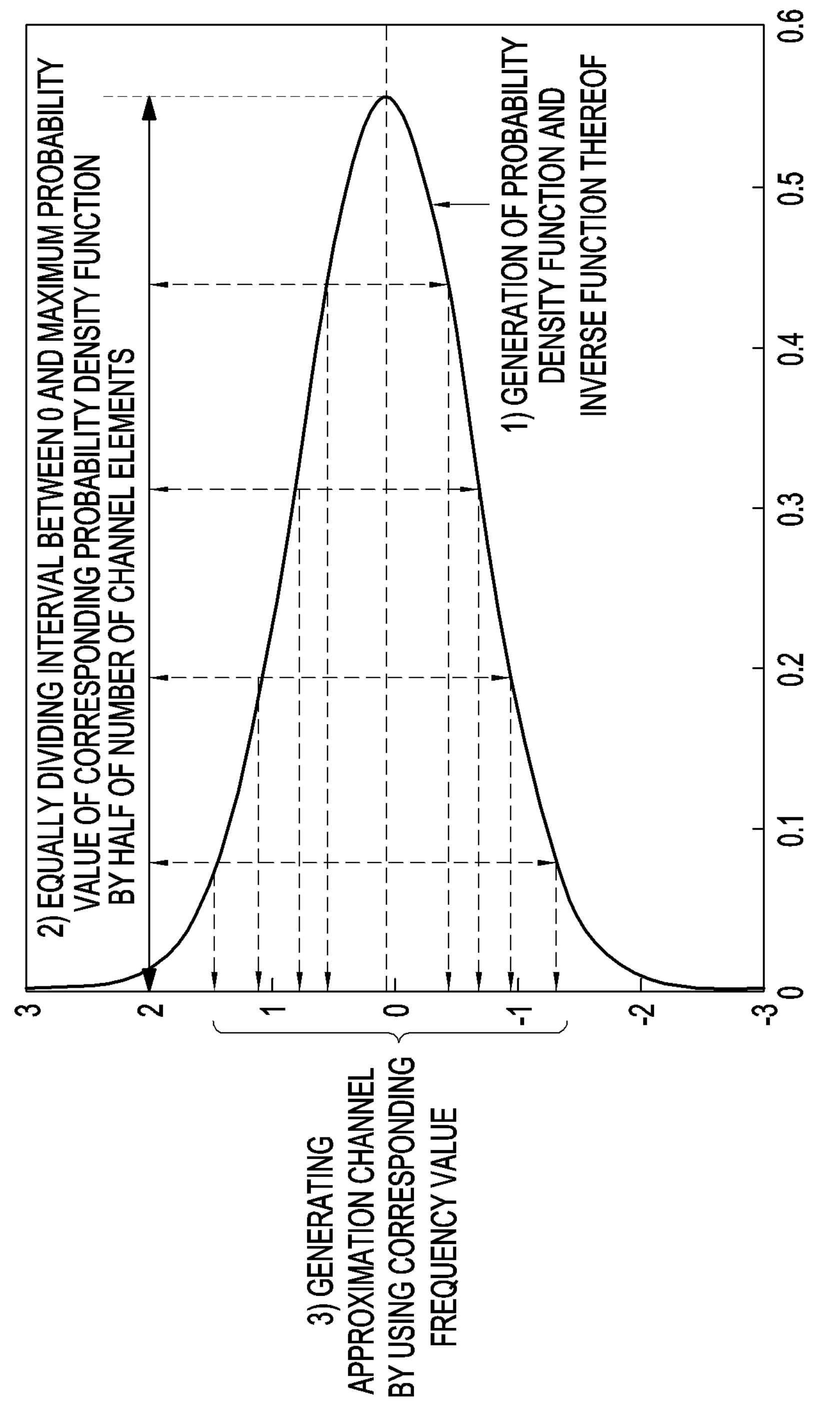

FIG. 4 is a graph that shows a procedure of generating an approximation channel by using a scheme using a probability density function having eight channel elements, when standard normal distribution is used.

Referring to FIG. 4, a probability density function is a function in which the x-axis indicates a frequency and the y-axis indicates a probability value between 0 and the maximum probability value of a corresponding probability density function. Therefore, an inverse function of a probability density function is a function in which the x-axis indicates a probability value and the y-axis indicates a frequency value. When a probability density function is a one-to-one correspondence function, the probability density function using scheme may be operated as the cumulative density function using scheme. However, when a probability density function is not a one-to-one correspondence function, the inverse function of the probability density function may have two output values with respect to one input value.

Therefore, when the interval between 0 to the maximum probability value of a corresponding probability density function is evenly divided by half of the number of channel elements in each of the groups and a corresponding value obtained from the division is input to the inverse function of the probability density function, two frequency values corresponding thereto may be obtained, and the frequency values may be used as an approximation channel value.

In addition to the schemes 1 to 3 shown in Table 7 above, a random probability distribution approximation releasing scheme of generating an approximation channel by using a probability distribution representing parameter which has been fed back may be applied.

2.5-2. Sort Order Restoring

In a sort order restoring procedure, the base station 100 uses an original sort order included in feedback information except for selective feedback to restore the original sort order of an approximation channel, which has been arranged in an order of the magnitudes thereof. The example of Equation (17) above may be used to perform the sort order restoring procedure as shown in Equation (29) below.

$$\bar{h}_r = \begin{bmatrix} -2.1351 \\ -1.3464 \\ -0.5642 \\ -0.2752 \\ -0.0636 \\ 0.0085 \\ 0.0858 \\ 0.6865 \end{bmatrix},\ s_r = \begin{bmatrix} 5 \\ 7 \\ 3 \\ 2 \\ 8 \\ 4 \\ 6 \\ 1 \end{bmatrix} \rightarrow \hat{h}_r = \begin{bmatrix} \bar{h}_r(5) \\ \bar{h}_r(7) \\ \bar{h}_r(3) \\ \bar{h}_r(2) \\ \bar{h}_r(8) \\ \bar{h}_r(4) \\ \bar{h}_r(6) \\ \bar{h}_r(1) \end{bmatrix} = \begin{bmatrix} -0.0636 \\ 0.0858 \\ -0.5642 \\ -1.3464 \\ 0.6865 \\ -0.2752 \\ 0.0085 \\ -2.1351 \end{bmatrix} = h_2 \tag{29}$$

Equation (29) above uses the example of Equation (17) above to explain a sort order restoring procedure. Therefore, it is noted that $h_r$ of Equation (17) above is fully restored through the sort order restoring procedure. However, in a real implementation, a sort order restoring procedure is performed on an approximation channel derived through a probability distribution approximation releasing procedure.

In addition, when a feedback information recombining procedure is performed in the order of probability distribution approximation releasing, sort order restoring, and releasing of grouping, a sort order restoring procedure is performed on the entirety of the approximation channel.

However, when a feedback information recombining procedure is performed in the order of probability distribution approximation releasing, releasing of grouping, and sort order restoring, a sort order restoring procedure is performed on each of groups.

2.5-3. Grouping Releasing

The scheme of a grouping releasing procedure is determined according to the above grouping scheme of Table 2 above and is performed in the reverse order of a grouping scheme used in the terminal. A default value of grouping releasing is configured to correspond to a default value of a grouping procedure. When a grouping procedure, which is not a default value, is applied, the base station uses grouping scheme information fed back from the terminal to identify a grouping scheme used in the terminal and then perform a grouping releasing procedure corresponding to the identified grouping scheme, according to the order reverse thereto.

In addition, as described above, in an embodiment, a grouping procedure is not necessary. Therefore, when the terminal has not performed a grouping procedure, the base station does not perform a grouping releasing procedure.

2.6 Channel Component Combining at Step S240

When the entire feedback information combining procedure is performed, the base station 100 may obtain, as an output value, channel vectors each divided by channel components. The base station 100 uses the mathematical formula expressions of separation components of Table 1 above to recombine channel components which have been separated by the terminal 200. A channel component combining scheme may be different according to the type of separation components.

When a channel component combining procedure is finished, the base station 100 may finally derive a channel between the base station 100 and the terminal 200, which the terminal 200 has fed back.

Hereinafter, a feedback information configuring method is described in greater detail with reference to FIGS. 5 to 12.

3. Feedback Information Configuration Matters 3.1 Feedback Information Configuration Matters According to Operations for Each of the Stages.

Table 8 below shows feedback information configuration matters required for the operations of each of the stages including channel component separation, feedback information generation performed by the terminal 200, and channel recombination using feedback information, and channel component combining performed by the base station 100.

TABLE 8

| | Feedback information configuration matters |
|---|---|
| 2.2. Channel component separation<br>2.6. Channel component combining | Feedback channel type information: Channel matrix, channel correlation matrix, the eigenvector of a channel correlation matrix, and port virtualization<br>Separation channel component type information: Real number/imaginary number, magnitude/phase, and real number/phase |
| 2.3-1. Grouping<br>2.5-3. Grouping releasing | Grouping scheme information: Equal number scheme, unequal number scheme |
| 2.3-2. Magnitude order sorting<br>2.5-2. Sort order restoring | Original sort order information |
| 2.3-3. Probability distribution approximation<br>2.5-1. Probability distribution approximation releasing | Probability distribution type information: Uniform, normal, Rayleigh distribution<br>Probability distribution representing parameter type information: Uniform distribution: minimum/maximum value, maximum/mean value of the difference, and minimum/mean value of the difference<br>Scalar quantization range for each of probability distribution representing parameters: scalar quantization ranges different according to channel element numbers, the same scalar quantization range according to channel element numbers |
| The others | Feedback information generating order<br>Feedback information combining order |

In Table 8 above, in the 2.2 channel component separation and 2.6 channel component combining operation, feedback information configuration relating to feedback channel type information and separation channel component type information is required. The feedback channel type information may include a channel matrix, a channel correlation matrix, the eigenvector of a channel correlation matrix, and the definition of a channel simplified during port virtualization. In addition, the separation channel component type information may include the real number/imaginary number components of a channel, the magnitude/phase components thereof, the real number/phase component thereof, and the definition of channel components arrangeable in the order of magnitudes thereof.

In the 2.3-1 grouping and 2.5-3 grouping releasing operation, feedback information configuration relating to grouping scheme information is required. The grouping information may include an equal number scheme, and an unequal number scheme, and the certain operations and configuration matters of each of the schemes have been described above with reference to Table 2 and thus are omitted here.

In the 2.3-2 magnitude order sorting and 2.5-2 sort order restoring operation, feedback information configuration relating to original sort order information is required. The original sort order information is associated with grouping scheme information and should be thus configured together with grouping scheme information when the feedback information is configured.

In the 2.3-3 probability distribution approximation and 2.5-1 probability distribution approximation releasing operation, feedback information configuration relating to probability distribution type information, probability distribution representing parameter type information, and scalar quantization information for each of probability distribution representing parameters is required. The type of probability distribution, to which arranged channel elements are approximated, may include uniform distribution, normal distribution, and Rayleigh distribution. The type of a probability distribution representing parameter, which can represent corresponding probability distribution, may be different depending on the types of probability distributions. For example, in the uniform distribution, the probability distribution representing parameters thereof may include the minimum value and the mean value of the difference, the maximum value and the mean value of the difference, and a parameter pair of the minimum value and the maximum value.

A feedback information configuration matter required in addition to the above feedback information configuration matters for the operations for each of the stages includes feedback information generating and combining orders. The feedback information generating and combining orders mean an order relating to channel component separation, grouping, and probability distribution approximation procedures, and an order relating to the reverse procedures thereof, respectively. The explicit CSI feedback scheme considered in the present disclosure may be utilized through feedback information between the base station 100 and the terminal 200 only when the terminal 200 and the base station 100 correspondingly use feedback information generating and combining orders, respectively.

3.2 Relation Between Feedback Information Configuration Matters

In relation to the feedback information configuration matters shown in Table 8 above, when a particular matter is determined, the determination may affect other matters. Table 9 below shows a relation between feedback information configuration matters.

In Table 9 above, feedback channel type configuration may have correlations with grouping scheme configuration and probability distribution approximation scheme configuration among the feedback information configuration matters. For example, the number of channel elements is determined according to which of a channel matrix, a channel correlation matrix, the eigenvector of a channel correlation matrix, and a channel simplified during port virtualization is determined as a feedback channel. The number of channel elements affects the feedback overhead, and the grouping scheme affects the feedback overhead. Therefore, grouping scheme configuration may vary depending on feedback channel type configuration. In addition, when a feedback channel is approximated according to the type of the corresponding feedback channel, a probability distribution approximation scheme, which can increase the channel restoring accuracy, may vary. That is, when the same probability distribution approximation scheme is used for each of feedback channel types, one feedback channel may achieve a low channel restoring accuracy while a particular feedback channel achieves a high channel restoring accuracy.

Separation channel component type configuration may have correlation with probability distribution approximation scheme configuration. For example, when the same probability distribution approximation scheme is applied to the case where a channel is divided into the magnitude/the phase components thereof and the case where a channel is divided into the real number/the imaginary number components thereof, two cases may have different channel restoring accuracies. A probability distribution approximation scheme which can increase a channel restoring accuracy may exist depending on which channel components a channel is divided.

TABLE 9

| | Feedback channel type | Separation channel component type | Grouping scheme | Magnitude order sorting scheme | Probability distribution approximation scheme | Feedback information generating and combining orders |
|---|---|---|---|---|---|---|
| Feedback channel type | — | — | ○ | — | ○ | — |
| Separation channel component type | — | — | — | — | ○ | — |
| Grouping scheme | ○ | — | — | ○ | ○ | ○ |
| Magnitude order sorting scheme | — | — | ○ | — | — | ○ |
| Probability distribution approximation scheme | ○ | ○ | ○ | — | — | ○ |
| Feedback information generating and combining orders | — | — | ○ | ○ | ○ | — |

According to an embodiment, as the accuracy on channel restoring is great, feedback overhead is increased. Therefore, the base station 100 or the terminal 200 determines feedback information configuration matters by considering the channel restoring accuracy and the feedback overhead. Therefore, a correlation may exist between the feedback information configuration matters affecting a channel restoring accuracy and feedback overhead.

Grouping scheme configuration may have correlations with feedback channel type configuration, magnitude order sorting scheme configuration, probability distribution approximation scheme configuration, feedback information generating and combining orders configuration. For example, the number of channel elements, which affects the feedback overhead, is adjusted according to feedback channel type configuration. Therefore, grouping scheme configuration affecting the feedback overhead may be determined.

Magnitude order sorting should be performed for each of groups according to a grouping scheme. Therefore, magnitude order sorting scheme information configuration is influenced by grouping scheme configuration. In addition, the channel restoring accuracy of a probability distribution approximation scheme may be determined according to which grouping procedure is used by grouping scheme configuration. In relation to the case where grouping is not used and the case where a certain grouping is used, the channel restoring accuracy may vary according to which probability distribution approximation scheme is used. For example, in the case where a certain grouping is used rather than the scheme in which grouping is not used, a probability distribution approximation scheme, which maximizes the channel restoring accuracy, may vary for each of the groups. In addition, a further higher channel restoring accuracy may be exhibited in a case where grouping is not used and a probability distribution approximation scheme is applied to all the channel elements, rather than a case where grouping is used and the same probability distribution approximation scheme is applied for each of the groups. Finally, an order of a grouping procedure and a probability distribution approximation procedure is adjusted according to feedback information generating and combining orders and thus may have correlation with grouping scheme configuration.

Magnitude order sorting scheme configuration may have correlations with grouping scheme configuration and feedback information generating and combining orders configuration. For example, magnitude order sorting scheme information may be influenced by a grouping scheme. In addition, as described above, an order of a grouping procedure and a probability distribution approximation procedure may be switched according to feedback information generating and combining orders. Therefore, magnitude order sorting scheme and original sort order information may be influenced by adjusting the order.

Probability distribution approximation scheme configuration may have correlations with feedback channel type configuration, separation channel component type configuration, grouping scheme configuration, feedback information generating and restoring orders configuration. For example, each of the feedback information configuration matters may have correlations with the type of the probability distribution of probability distribution approximation to be performed, the parameters which can represent the probability distribution of the corresponding type, the configuration of a scalar quantization range used when each of probability distribution representing parameters is fed back, and the like, depending on the feedback information configuration matters.

Feedback information generating and combining orders configuration may have correlations with grouping scheme configuration, magnitude order sorting scheme configuration, and probability distribution approximation scheme configuration. Because a probability distribution approximation scheme is the greatest factor increasing the channel restoring accuracy, probability distribution approximation scheme configuration may have multiple feedback information configuration matters having correlation therewith. In addition, because a grouping scheme is the greatest factor increasing or decreasing the feedback overhead, grouping scheme configuration may have multiple feedback information configuration matters having correlation therewith.

4. Feedback Information Configuring Scheme and Feedback Operation Scheme

Hereinafter, with reference to the feedback information configuration matters shown in Table 8 above, a feedback information configuring scheme and a feedback operation scheme for an explicit CSI feedback scheme according to an embodiment is described below in greater detail. For example, feedback information configuration which operates at the time of the initial access of the terminal, a correlation existing between feedback configuration matters, and feedback information configuration possible for each of feedback configuration matters is described below.

A periodic/aperiodic feedback information configuring scheme and feedback operation scheme, a WB/SB feedback information configuring scheme and feedback operation scheme, and a feedback information configuring scheme and feedback operation scheme according to the determination of the base station 100 or terminal 200 existing as a feedback information configuring scheme and a feedback operation scheme according to an embodiment. A scheme in which two or more among the three schemes are mixed is also possible. In addition, in an embodiment, a feedback information configuring scheme and feedback operation scheme for explicit CSI feedback may have correlation with an implicit CSI feedback information configuring scheme and feedback operation scheme of LTE.

4.1 A Default Value of Feedback Information Configuration and Feedback Operation Scheme at the Time of Initial Access Table 10 below shows a default value of feedback information configuration which the terminal 200 uses in order to perform explicit CSI feedback when the terminal 200 initially accesses the base station 100, according to an embodiment. The default value of feedback information configuration of Table 10 corresponds to an embodiment, and a default value different therefrom of feedback information configuration may be used.

TABLE 10

| Feedback information configuration matters | Feedback information configuration default value (WB configuration) |
|---|---|
| Feedback channel type | Channel matrix |
| Separation channel component type | Real number/imaginary number component |
| Grouping scheme | — |
| Original sort order | — |
| Probability distribution type | Real number/imaginary number component: normal distribution |
| Probability distribution representing parameter type | Normal distribution: the mean and standard deviation value |
| Scalar quantization range for each of probability distribution representing parameters | Normal distribution mean value: −1-1<br>Normal distribution standard deviation: 0-2 |
| Feedback information generating and combining orders | Feedback information generating and combining orders: the order of grouping, magnitude order sorting, probability distribution approximation |

TABLE 10-continued

In Table 10 above, according to an embodiment, the base station 100 or the terminal 200 uses a channel matrix as a default value of a feedback channel type, and uses real number/imaginary number components, as a default value of a separation channel component type. The base station 100 or the terminal 200 does not use the default value of a grouping scheme and an original sort order. The base station 100 or the terminal 200 uses normal distribution on all of the real number/imaginary number components, as a default value of a probability distribution type, and uses a mean and a standard deviation of the normal distribution as a default value of a probability distribution representing parameter type. The base station 100 or the terminal 200 configures a default value of a scalar quantization range for each of probability distribution representing parameters such that the mean of normal distribution is −1 −1, and the standard deviation of normal distribution is 0-2. The base station 100 or the terminal 200 configures the order of grouping, magnitude order sorting, and probability distribution approximation, as a default value of feedback information generating and combining orders. As described above, in relation to feedback information generating and combining orders, the order of grouping, magnitude order sorting, and probability distribution approximation and the order of magnitude order sorting, grouping, and probability distribution approximation exist according to the order of a grouping procedure. However, the default values of feedback information configurations does not include a grouping stage. Therefore, there is no difference caused by the order. All of the default values of feedback information configurations are basically configured to be operated by a WB. That is, the default values of feedback information configurations are identically used throughout the entire band. Then, when additional feedback information is configured, the above identical use may be changed to allow each of feedback information configuration matters to be operated by a WB or an SB.

Although all the default values of feedback information configurations are configured to be operated by a WB according to an embodiment, original sort order information may be configured to be operated by a WB, and probability distribution representing parameter information may be configured to be operated by an SB in the default feedback operation. That is, in relation to original sort order information, pieces of original sort order information for SBs constituting a WB are averaged to generate WB feedback information and then feed the same back. In relation to probability distribution representing parameters, a feedback value is determined and fed back for each of SBs according to probability distribution types, probability distribution representing parameter types, scalar quantization ranges for probability distribution representing parameters, which are configured by a WB.

Figure 5:
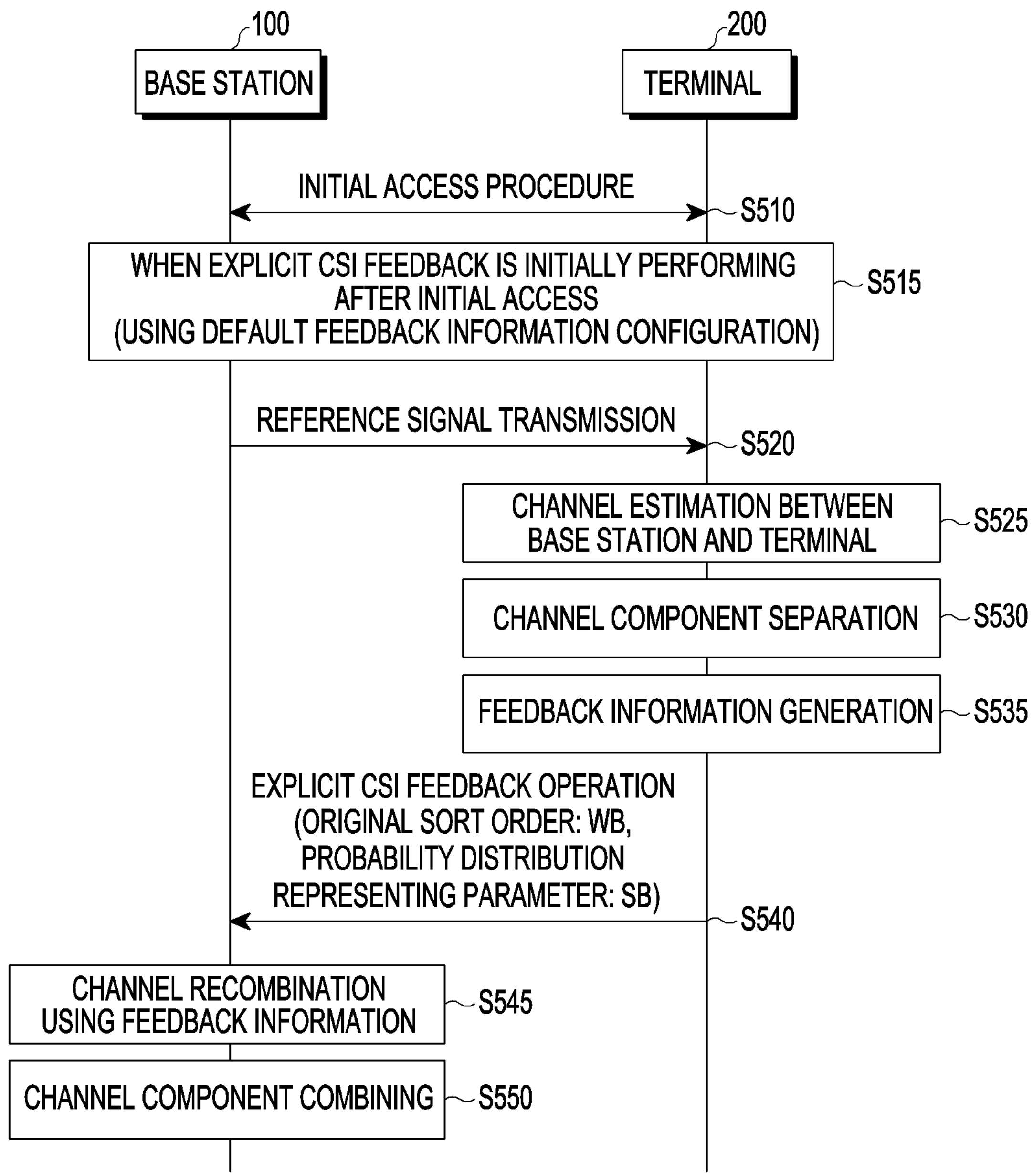
FIG. 5 is a flow diagram showing default feedback information configuration and feedback operation at a time of initial access according to an embodiment.

FIG. 5 is a flow diagram showing a default feedback information configuration and feedback operation at a time of initial access according to an embodiment.

Referring to FIG. 5, the base station 100 and the terminal 200 initially access through an initial access procedure at step S510. After the initial access, the base station 100 and the terminal 200 initially perform explicit CSI feedback by using a default value of feedback information configuration at step S515.

Then, the base station 100 transmits a reference signal to the terminal 200 at step S520.

Then, the terminal 200 estimates a channel between the base station 100 and the terminal 200 at step S525, separates channel components at step S530, and generates feedback information at step S535.

Then, the terminal 200 transmits explicit CSI feedback to the base station 100 at step S540. For example, a feedback value of original sort order information among pieces of feedback information is determined by a WB and then the determined value is transmitted, and a feedback value of a probability distribution representing parameter is determined by an SB and then the determined value is transmitted.

Then, the base station 100 recombines the channel by using feedback information received from the terminal 200 at step S545 and combines the channel components at step S550 to finally obtain CSI information between the base station 100 and the terminal 200.

The base station 100 or the terminal 200 may change a default value of feedback information configuration shown in Table 9 above, through configuring of feedback information after initial access. Hereinafter, a basic feedback information configuring scheme for each of feedback information configuration matters and a feedback operation scheme of the base station 100 and the terminal 200 are described in greater detail.

4.1-1. Feedback Channel Type Information

Feedback channel types used in an explicit CSI feedback scheme according to an embodiment include a channel matrix, a channel correlation matrix, the eigenvector of a channel correlation matrix, and a channel simplified according to port virtualization. A feedback channel type may be determined depending on various conditions including a precoding scheme of the base station, a channel restoring accuracy through probability distribution approximation, feedback overhead, etc. In addition, feedback channel type information may be related to a grouping scheme and a probability distribution approximation scheme, and feedback channel type information may be determined in association with feedback information configuration required for a grouping scheme and a probability distribution approximation scheme. The base station 100 or the terminal 200 performs feedback information configuration relating to feedback channel type information by using the number of bits, which can represent all of the feedback channel types commonly defined by the base station 100 and the terminal 200.

4.1-2. Separation Channel Component Type Information

A separation channel component type used in an explicit CSI feedback scheme according to an embodiment, is configured by a component representing a channel element which is a complex number, and allowing channel elements to be arranged in an order of the magnitudes thereof. A representative separation channel component type includes magnitude/phase components, real number/imaginary number components, and real number/phase components. A separation channel component type may be determined depending on various conditions including a channel restoring accuracy through probability distribution approximation, feedback overhead, etc. A separation channel component type has correlation with a probability distribution approximation scheme. Therefore, a separation channel component type may be determined in association with feedback information configuration required for a probability distribution approximation scheme. The base station 100 or the terminal 200 performs feedback information configuration relating to feedback channel type information by using the number of bits, which can represent all of the feedback channel types commonly defined by the base station 100 and the terminal 200.

4.1-3. Grouping Scheme Information

Various grouping schemes may be used in an explicit CSI feedback scheme according to an embodiment. A grouping scheme may be used together with a default value of feedback information configuration, and may not be used. When a grouping scheme is used, various equal number schemes and unequal number schemes may be used as shown in Table 2 above. Three embodiments corresponding to each of an equal number scheme and an unequal number scheme have been described in Table 2 above. However, it is natural that various equal number schemes and unequal number schemes in addition thereto are possible. Feedback information configuration for a grouping scheme is performed by using one bit information relating to whether a grouping scheme is used, one bit information relating to whether an equal number scheme or an unequal number scheme is used, and the number of bits which can represent all of the equal number schemes and unequal number schemes.

In addition, when the base station 100 and the terminal 200 intends to newly define and use a particular grouping scheme in addition to all of the initially defined equal number schemes and unequal number schemes, the base station 100 and the terminal 200 may newly define an equal number scheme and an unequal number scheme. When the base station 100 and the terminal 200 newly defines an equal number scheme and an unequal number scheme, the base station 100 and the terminal 200 generates feedback information to express the number of groups used in a newly defined grouping scheme and the index of a component included in each of the groups so as to entirely express the equal number scheme or unequal number scheme. After an equal number scheme and an unequal number scheme are newly defined, the number of bits, which can represent all of the equal number schemes and unequal number schemes including the newly defined schemes, should be used when feedback information is configured.

4.1-4. Probability Distribution Type Information

Probability distribution type information used in an explicit CSI feedback scheme according to an embodiment may be determined by considering a channel restoring accuracy, a feedback overhead, etc. A channel restoring accuracy indicates the accuracy of a restored channel of the case where separated channel components are approximated to a particular probability distribution, and a feedback overhead is determined depending on the number of parameters which can represent probability distribution.

When feedback information configuration relating to a grouping scheme is performed by the base station 100 and the terminal 200, feedback information configuration relating to whether to use the same probability distribution type for each of groups, or different types for groups may be performed. In relation to probability distribution type information, at least one among probability distribution types defined by the base station and terminals during initial access may be used, and a new probability distribution type may be newly defined by considering a channel restoring accuracy, a feedback overhead, etc. Feedback information configuration relating to a probability distribution type may be performed by using the number of bits, which can represent all of the probability distribution types commonly defined by the base station 100 and the terminal 200. After a probability distribution type is newly defined, the number of bits which can represent all of the probability distribution types including the newly defined probability distribution type should be used when feedback information is configured.

4.1-5. Probability Distribution Representing Parameter Type Information

Probability distribution representing parameter type information used in an explicit CSI feedback scheme according to an embodiment is determined corresponding to a parameter which can represent probability distribution according to the type of the corresponding probability distribution. Parameters representing particular probability distribution may be unique or not unique.

In an example of a case where parameters representing particular probability distribution are not unique, uniform distribution may be expressed by a minimum/maximum value, a maximum/mean value of a difference, a minimum/mean value of a difference, and a combination of various representing parameters which can represent the uniform distribution, besides the same. Therefore, in the case where parameters used for representing probability distribution are not unique like uniform distribution, when feedback information configuration relating to probability distribution type information is performed, feedback information configuration relating to probability distribution representing parameter type information should be performed together.

In an example of the case where a parameter representing particular probability distribution is unique, normal distribution may be expressed by mean/standard deviation parameters, and Rayleigh distribution may be expressed by a parameter. Therefore, when parameters used for representing probability distribution are unique like normal distribution and Rayleigh distribution, feedback information configuration for probability distribution representing parameter type information is not required.

In Table 9 above, a probability distribution approximation scheme has a correlation with a separation channel component type. In consideration of a correlation between a probability distribution approximation scheme and a separation channel component type, feedback on a particular probability distribution representing parameter is prevented in a case of the combination of a certain separation channel component and probability distribution type, so that the feedback overhead can be decreased.

The case where magnitude/phase components are determined as a separation channel component type, and uniform distribution is used for phase components is described below as an example. For example, the number of channel elements is M, a probability distribution approximation scheme is uniform distribution, and a probability distribution representing parameter type is a maximum value/the mean value of a difference. A phase component is a value between 0 to 2 pi. Therefore, as M increases, the maximum value converges on 2 pi, and the mean value of a difference converges on 2 pi/(M−1). When a separation channel component type is real number/imaginary number components, and all of the real number/imaginary number components are approximated to normal distribution, the mean value among the mean and the standard deviation, which are probability distribution representing parameters thereof, may converge to 0 as the number of channel elements increase. Therefore, when a channel having a great number of channel numbers is fed back by using an explicit CSI feedback scheme, feedback on a probability distribution representing parameter may be omitted depending on whether a particular separation channel component type and probability distribution type is used.

The configuration of a probability distribution representing parameter type information among pieces of feedback information is determined according to probability distribution type information when parameters used for representing particular probability distribution are unique, and is performed by using the number of bits which can represent all of the probability distribution representing parameter types, when the parameters are not unique. In addition, when there are multiple types of probability distribution representing parameters, the same number of bits may be allocated for each of probability distribution representing parameters, and different numbers of bits may be allocated for probability distribution representing parameters, respectively. In addition, feedback information configuration may be performed by considering the omission of feedback on a probability distribution representing parameter according to a particular separation channel component type and probability distribution type used for an explicit CSI feedback.

4.1-6. Scalar Quantization Range for Each of Probability Distribution Representing Parameters A scalar quantization range for each of probability distribution representing parameters used in an explicit CSI feedback scheme according to an embodiment indicates a range in which the terminal 200 performs scalar quantization to feed a corresponding probability distribution representing parameter back to the base station 100. A scalar quantization range for each of probability distribution representing parameters may be updated from the feedback information configuration at the time of initial access. When a feedback channel type, a separation channel component type, a probability distribution type, and a probability distribution representing parameter type are determined through particular feedback information configuration, the terminal 200 uses corresponding feedback information configuration to approximate a feedback channel and then obtain an actual value of the probability distribution representing parameter. Then, the terminal 200 continuously accumulate the obtained actual value of the probability distribution representing parameter to generate a scalar quantization range. A scalar quantization range should be determined for each of the above feedback channel type, separation channel component type, probability distribution type, and probability distribution representing parameter type. In addition, a scalar quantization range may be identical or different according to channel element numbers.

4.1-7. Feedback Information Generating and Combining Orders

The value of feedback information generating (the order of grouping, magnitude order sorting, and probability distribution approximation, or the order of magnitude order sorting, grouping, and probability distribution approximation) and combining orders (the order of probability distribution approximation releasing, releasing of magnitude order sorting, and grouping releasing, or the order of probability distribution approximation releasing, grouping releasing, and releasing of magnitude order sorting) may have meaning depending on whether grouping is performed, in an explicit CSI feedback scheme according to an embodiment. When there is no feedback information configuration relating to a grouping scheme as the default value of feedback information configuration, there is no difference of the operations according to feedback information generating and combining orders. Therefore, when there is no feedback information configuration of a grouping scheme, a feedback information generating order is configured by the order of grouping, magnitude order sorting, and probability distribution approximation, and a combining order is configured by the order of probability distribution approximation releasing, releasing of magnitude order sorting, and grouping releasing. After feedback information configuration is performed for a grouping scheme, feedback information generating and combining orders are determined. The feedback information configuration relating to feedback information generating and combining orders can be performed by one bit.

4.2 Periodic/Aperiodic Feedback Information Configuring Scheme and Feedback Operation Scheme The base station 100 or the terminal 200 may periodically or aperiodically configure feedback information configuration matters for an explicit CSI feedback, according to an embodiment. Table 11 below shows a relative long and short relation of periods relating to periodic feedback information configuration matters according to an embodiment. The greater the relative feedback period value, the longer the feedback information configuration period, and a relative feedback period value does not determine the length of a corresponding period.

TABLE 11

| Relative feedback information configuration period | Feedback information configuration matters |
|---|---|
| 1 | Probability distribution type information<br>Probability distribution representing parameter type information |
| 2 | Grouping scheme information |
| 3 | Feedback channel type information<br>Separation channel component type information |
| 4 | Feedback information generating and combining orders<br>Scalar quantization range for each of probability distribution representing parameters |

In Table 11 above, on the basis of the correlation between the above feedback information configuration matters (Table 9 above), it is noted that a correlation with another feedback information configuration matter is inversely proportional to a relative feedback information configuration period value. Each of probability distribution type information and probability distribution representing parameter type information, which has a relative feedback information configuration period value of 1, has a lot of feedback information configuration matters having correlations therewith. Therefore, probability distribution type information and probability distribution representing parameter type information may have a short period in which information is changed according to the change of a channel during periodic feedback information configuration.

Periodic feedback information configuration may operate independently or dependently between pieces of feedback information. The independent periodic feedback information configuration between pieces of feedback information only considers a relative long and short relation between the periods of feedback information configuration matters, as shown in Table 11, and operates without a particular relation between the periods of feedback information configuration matters. The dependent periodic feedback information configuration between pieces of feedback information operates in consideration of even a particular relation between the periods of feedback information configuration matters as well as a relative long and short relation between the periods of the feedback information configuration matters shown in Table 11 above. A particular relation between the periods of feedback information configuration matters may be determined on the basis of the above described relation shown in Table 8 above between the feedback information configuration matters. A relation between the feedback information configuration periods of the matters in the dependent periodic feedback information configuration between pieces of feedback information corresponds to, for example, the relation to each other in which one of the feedback information configuration periods is a multiple of another period, or the relation of the case where, when a predetermined time has passed after the configuration of particular feedback information, another matter are fed back.

Figure 6:
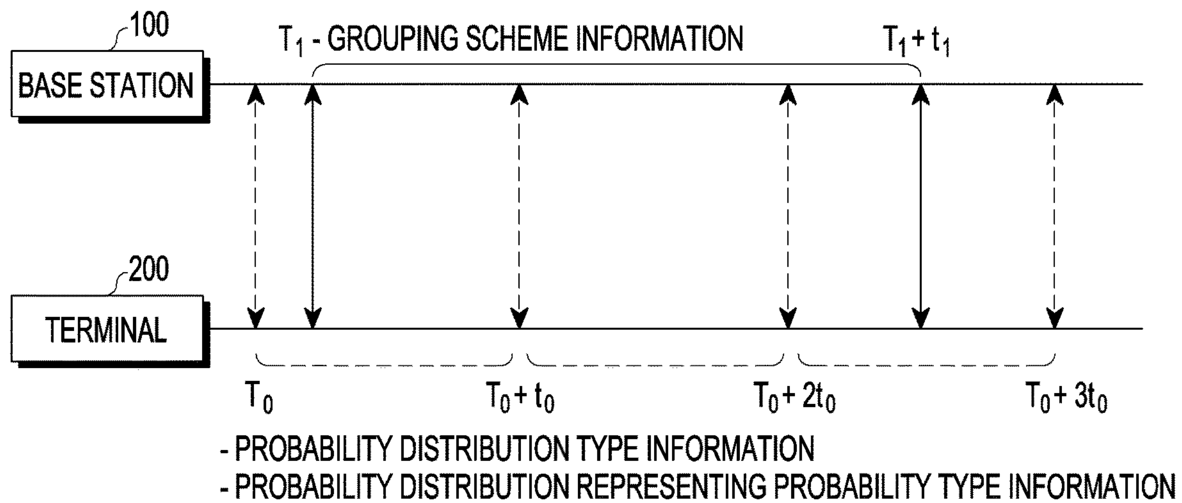
FIG. 6 is a diagram of a periodic feedback information configuration in consideration of a relative long and short relation between periods of feedback information configuration matters, according to an embodiment.

FIG. 6 is a diagram of a periodic feedback information configuration according to an embodiment.

Referring to FIG. 6, the base station 100 and the terminal 200 transmits and receives a first feedback information configuration matter by the period of t0, and a second feedback information configuration matter by the period of t1. The periods t0 and t1 only have a relative long and short relation and do not have a particular relation therebetween, and thus corresponds to independent periodic feedback information configuration. The first feedback information configuration matter may be probability distribution type information and probability distribution representing parameter type information configuration matters, and the second feedback information configuration matter may be grouping scheme information configuration matter. T0 indicates an initial feedback information configuration time relating to probability distribution type information and probability distribution representing parameter type information, and t0 indicates a feedback information configuration period relating to probability distribution type information and probability distribution representing parameter type information. T1 indicates an initial feedback information configuration time relating to grouping scheme information, and t1 indicates a feedback information configuration period relating to grouping scheme information.

Aperiodic feedback information configuration may be generated for a certain reason in which additional configuration is required between the periods of feedback information configuration matters. For example, aperiodic feedback information configuration may be performed in a case where a scalar quantization range value is drastically changed within a period of the feedback information configuration relating to the scalar quantization range for each of probability distribution representing parameters, or in a case where the base station does not have a scalar quantization range value of a probability distribution representing parameter because of the combination of a feedback channel type, a separation channel component type, a probability distribution type, or a probability distribution representing parameter type, which is not conventionally used. The longer the period at the time of periodic feedback information configuration among feedback information configuration matters, the greater the probability that aperiodic feedback information configuration may occur. In addition, a new definition for each of feedback information configuration matters may be performed only by aperiodic feedback information configuration.

Figure 7:
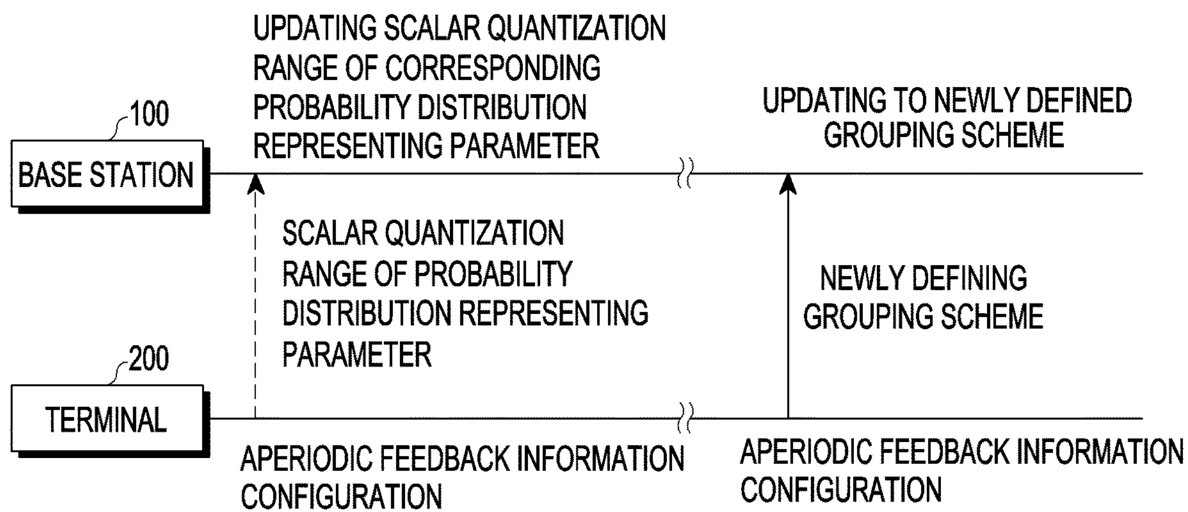
FIG. 7 is a diagram of an aperiodic feedback information configuration according to an embodiment.

FIG. 7 is a diagram of an aperiodic feedback information configuration according to an embodiment.

Referring to FIG. 7, when a scalar quantization range value is rapidly changed, the terminal 200 configures aperiodic feedback information and transmits the scalar quantization range information of a probability distribution representing parameter to the base station 100. Then, the base station 100 updates the scalar quantization range of the corresponding probability distribution representing parameter, which has been received from the terminal 200. In addition, when a grouping scheme is newly defined, the terminal 200 configures aperiodic feedback information and transmits newly defined information relating to the grouping scheme to the base station 100. Then, the base station 100 updates to a newly defined grouping scheme received from the terminal 200.

The base station 100 and the terminal 200 according to an embodiment may periodically or aperiodically perform an explicit CSI feedback operation. In a periodic feedback operation, original sort order information has a period longer than that of a probability distribution representing parameter in consideration of the feedback overhead, etc. Original sort order information may be influenced by the feedback information configuration matters each having a relative feedback information configuration period, which is greater than or equal to 2, as shown in Table 11 above. Therefore, when feedback information relating to the feedback information configuration matters each having a relative feedback information configuration period greater than or equal to 2 is configured, original sort order information may be transmitted through an aperiodic feedback operation by the terminal 200 to the base station 100. In addition, an aperiodic feedback operation for original sort order information or a probability distribution representing parameter may be performed according to the current feedback information configuration scheme for a particular reason.

4.3 WB/SB Feedback Information Configuring Scheme and Feedback Operation Scheme

The base station 100 or the terminal 200 according to an embodiment may configure feedback information configuration matters for an explicit CSI feedback by WB or SB feedback information. The fact that each of feedback information configuration schemes and feedback operation schemes is operated by an SB implies that an individual feedback information configuration and feedback operation is performed for each of the SBs, and the fact that the feedback information configuration schemes and feedback operation schemes are operated by a WB implies that only one feedback information configuration and feedback operation is performed for the entire band. All of the default values of the feedback information configurations at the time of initial access, as shown in Table 10 above, may be configured by a WB. After initial access, the base station 100 and the terminal 200 may configure feedback information such that a particular feedback information configuration matter is operated by an SB, and may configure different pieces of feedback information for a plurality of SBs, respectively. For example, when feedback information is configured such that a scalar quantization range for each of probability distribution representing parameters is operated by an SB, the terminal 200 calculates a scalar quantization range for each of probability distribution representing parameters for each of the SBs, and the base station 100 separates, for each of the SBs, information relating to a scalar quantization range according to a combination of a feedback channel type, a separation channel component type, a probability distribution type, and a probability distribution representing parameter type, which are conventionally operated by a WB and retained by the base station 100, and stores the separated pieces of information to correspond to the SBs, respectively, to use the same. In addition, when the feedback information configuration matter, which has been configured by a WB, is changed to use an SB, the terminal 200 identically uses a feedback information configuration matter value, which has been configured by a WB, to all of the SBs before additional feedback information configuration is performed. Then, individual feedback information configuration for each of the SBs is possible through subsequent feedback information configuration.

Figure 8:
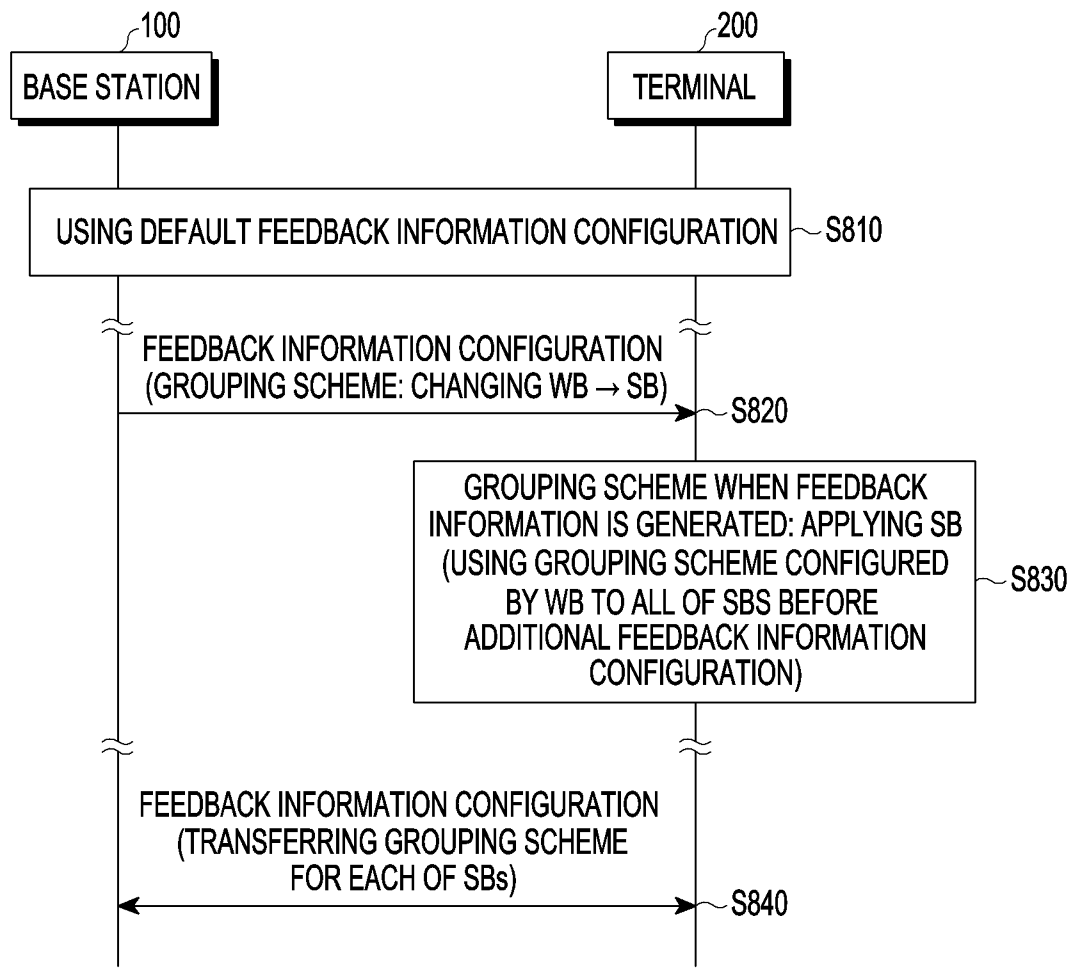
FIG. 8 is a flow diagram of a WB/SB configuration during a feedback information configuration according to an embodiment.

FIG. 8 is a flow diagram of a WB/SB configuration during feedback information configuration according to an embodiment.

Referring to FIG. 8, the base station 100 and the terminal 200 uses a default value of feedback information configuration at step S810, and all of the default values of feedback information configurations are performed by a WB.

Then, when a certain event occurs, the base station 100 transmits, to the terminal 200, feedback information configuration for changing grouping scheme configuration from a WB to an SB at step S820.

Then, when feedback information is generated, the terminal 200 applies an SB to a grouping scheme at step S830. In addition, since the terminal 200 has received, from the base station 100, the feedback information for changing grouping scheme configuration from a WB to an SB, the terminal 200 may use the grouping scheme configured by a WB to all the SBs before first feedback information is configured.

Then, the base station 100 and the terminal 200 configure feedback information including a grouping scheme for each of SBs at step S840. The base station 100 or the terminal 200 according to an embodiment may configure feedback information configuration matters for an explicit CSI feedback by WB or SB feedback information.

The base station 100 and the terminal 200 according to an embodiment may configure feedback information by a WB or an SB, to perform a feedback operation. As described above, in relation to original sort order information, the default value of the feedback operation scheme allowing the information to be fed back by a WB is used. However, the feedback information configuration may be changed so as to the information to be fed back for each of the SBs for a particular reason, and the feedback operation allowing original sort order information for each of the SBs to be fed back may be performed. In addition, in relation to a probability distribution representing parameter, as described above, the default value of the feedback operation scheme allowing the parameter to be fed back by an SB is used. However, the feedback information configuration may be changed so as to the parameter to be fed back by a WB for a particular reason, and then the feedback operation may be performed. A feedback operation for a WB and a feedback operation for each of the SBs may be performed by the definition of the current feedback information configuration scheme.

Figure 9:
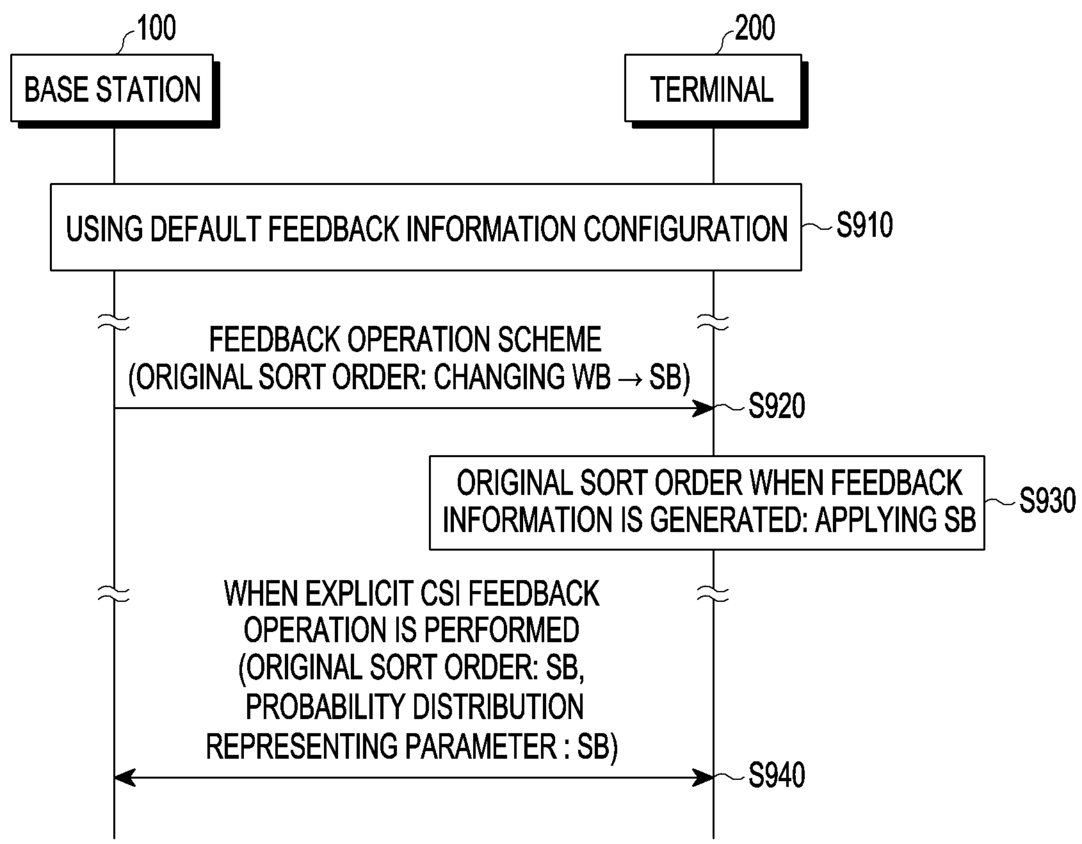
FIG. 9 is a flow diagram of a WB/SB configuration during a feedback operation according to an embodiment.

FIG. 9 is a flow diagram of a WB/SB configuration during feedback operation according to an embodiment.

Referring to FIG. 9, the base station 100 and the terminal 200 uses a default value of feedback information configuration at step S910, and all of the default values of feedback information configurations are performed by a WB.

Then, when a particular event occurs, the base station 100 transmits, to the terminal 200, feedback operation scheme information for changing original sort order information generating from a WB to an SB in step S920.

Then, when feedback information is generated, the terminal 200 generates original sort order information for each of the SBs at step S930.

Then, the terminal 200 transmits, to the base station 100, feedback including original sort order information and probability distribution representing parameter information generated for each of the SBs during an explicit CSI feedback operation at step S940.

4.4 Feedback Information Configuring Method and Feedback Operation Method Which are Performed by Base Station/Terminal The base station 100 or the terminal 200 according to an embodiment may configure feedback information for an explicit CSI feedback. In a case where certain feedback information configuration is required in the entire system, when the base station 100 transmits a particular feedback information configuring instruction to the terminal 200 or transmits a request for particular feedback information configuration to the terminal 200, the terminal 200 may transmit a particular feedback information configuration instruction to the base station 100. In contrast, when the terminal 200 transmits a particular feedback information configuring instruction to the base station 100 or transmits a request for certain feedback information configuration to the base station 100, the base station 100 may transmit a particular feedback information configuring instruction to the terminal 200.

In addition, there are certain feedback information configuration matters which only one among the base station 100 and the terminal 200 can configure. For example, matters related to new definition allowed in grouping scheme information and probability distribution type information may be configured only in the terminal 200. A scalar quantization range for each of probability distribution representing parameters is the information which can be calculated by the terminal 200 and then fed back to the base station 100. Therefore, a scalar quantization range matter for each of probability distribution representing parameters may be configured only in the terminal 200.

Based on the above described feedback information configuration, a feedback operation is performed from the terminal 200 to the base station 100.

Figure 10:
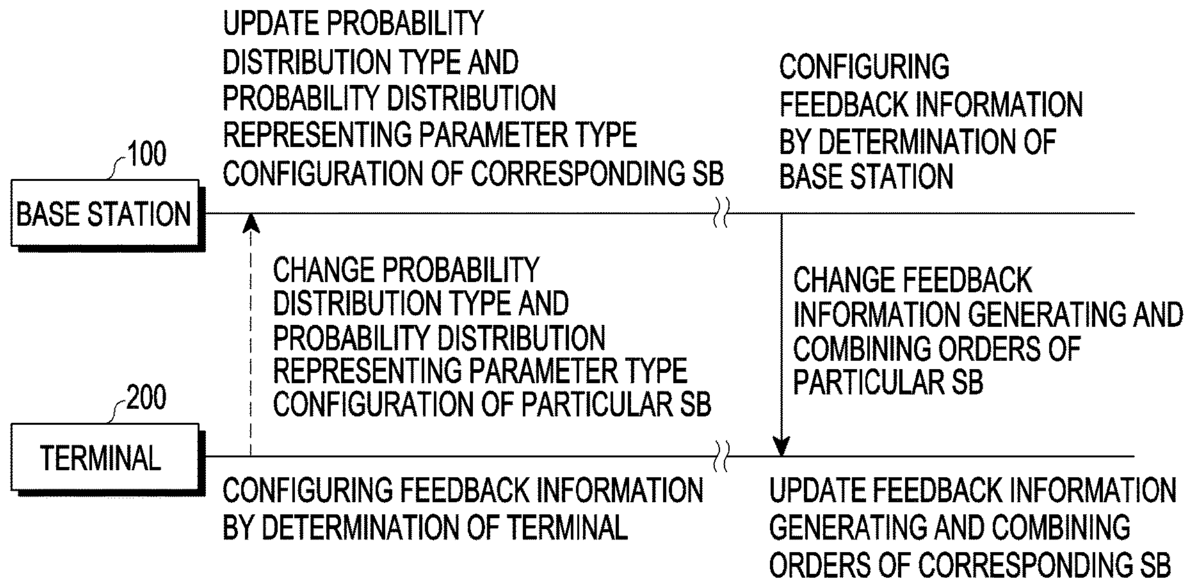
FIG. 10 is a flow diagram of a feedback information configuration performed by a determination of a base station/terminal according to an embodiment.

FIG. 10 is a diagram of a feedback information configuring method performed by a determination of a base station/terminal according to an embodiment.

Referring to FIG. 10, the terminal 200 configures feedback information and transmits a probability distribution type and probability distribution representing parameter type configuration change for a particular SB to the base station 100. Then, the base station 100 updates the configuration of the probability distribution type and probability distribution representing parameter type for the corresponding SB. In contrast, the base station 100 configures feedback information and transmits a feedback information generating and combining orders change for a particular SB to the terminal 200. Then, the terminal 200 updates the configuration of the feedback information generating and combining orders for the corresponding SB.

4.5 Relation Between Implicit CSI Feedback Information Configuring Scheme and Feedback Operation Scheme When the base station 100 receives channel state information fed back from the terminal 200, an explicit. CSI feedback information configuring scheme or an implicit CSI feedback information configuring scheme of LTE according to an embodiment may be used. Therefore, an indicator that can identify an explicit or an implicit CSI feedback information configuring scheme is required.

For example, in the NR-MIMO system, implicit CSI feedback is performed as a default feedback scheme. Therefore, an explicit CSI feedback scheme can be operated by the transfer of an indicator configured to identify a newly defined implicit/explicit CSI feedback scheme. As described above, in an explicit CSI feedback scheme of the present disclosure, feedback information may be performed by the determination of the base station 100 and the terminal 200. Therefore, the base station and the terminal may transmit an indicator configured to identify an implicit/explicit CSI feedback scheme.

For example, an implicit CSI feedback of LTE is performed on the basis of a CQI, a PMI, an RI, and a CRI, and in an implicit CSI feedback, periodic or aperiodic feedback is possible as an explicit CSI feedback operation of the present disclosure. The periodic feedback operation of implicit/explicit CSI feedback may be performed in an independent relation between the periods of respective feedback schemes, or may be performed in a dependent relation therebetween. In all the cases of operating in an independent or dependent relation, the period of explicit CSI feedback is relatively longer than that of implicit CSI feedback. In addition, a period for each of the pieces of feedback information of implicit CSI feedback may be adjusted based on information which may be inferred from explicit CSI feedback. For example, when a feedback operation for a channel matrix is performed in explicit CSI feedback, information replacing an RI may be inferred in consideration of the orthogonality between column vectors of the channel matrix fed back from the terminal 200 to the base station 100.

In addition, in an implicit/explicit CSI feedback, WB and SB feedback is possible, and WB feedback information and SB feedback information may be configured to have a correlation therebetween. Based on pieces of feedback information for each of the SBs of implicit CSI feedback, the base station 100 or the terminal 200 may change WB or SB feedback information configuration of explicit CSI feedback. For example, the base station 100 or the terminal 200 may configure feedback information of explicit CSI feedback to allow the same option to be configured for each of the SBs determined to have similar pieces of feedback information in an implicit CSI feedback operation. In addition, the base station 100 or the terminal 200 may identify whether a feedback channel type corresponds to a port virtualization channel, or is determined to be one of a channel matrix, a channel correlation matrix, and the eigenvector of a channel correlation matrix, according to whether a CRI is fed back in an implicit CSI feedback operation. In addition, the base station 100 or the terminal 200 may perform the feedback information configuration of changing a feedback channel type used in an explicit CSI feedback, according to PMI and RI information transferred by an implicit CSI feedback.

Figure 11:
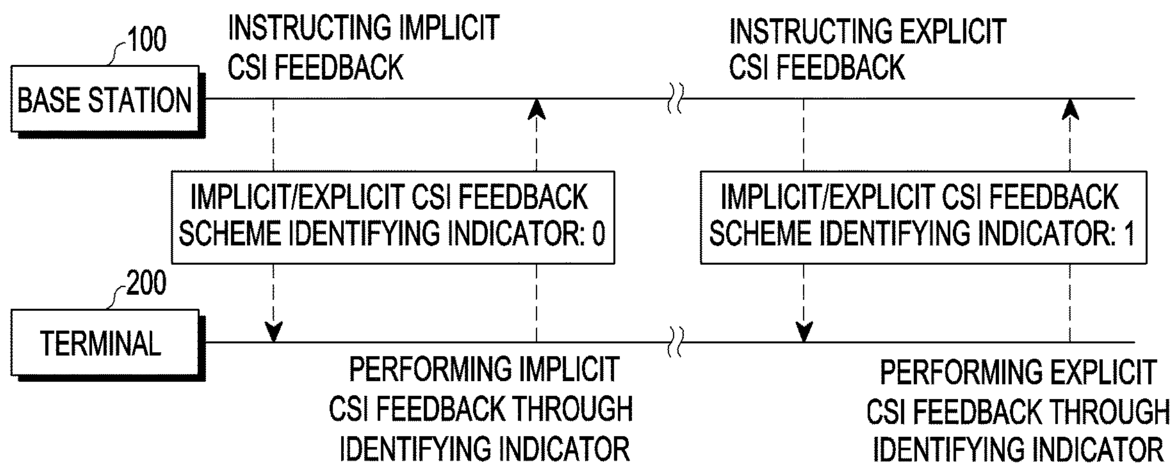
FIG. 11 is a flow diagram of a feedback operation according to an implicit/explicit CSI feedback identifying indicator according to an embodiment.

FIG. 11 is a diagram of a feedback operation according to an implicit/explicit CSI feedback identifying indicator according to an embodiment.

Referring to FIG. 11, the base station 100 transmits an indicator 0 or 1 configured to discriminate implicit/explicit CSI feedback schemes, in order to indicate implicit CSI feedback. Then, the terminal 200 performs implicit CSI feedback or explicit CSI feedback according to the received indicator configured to identify an implicit/explicit CSI feedback scheme.

Figure 12:
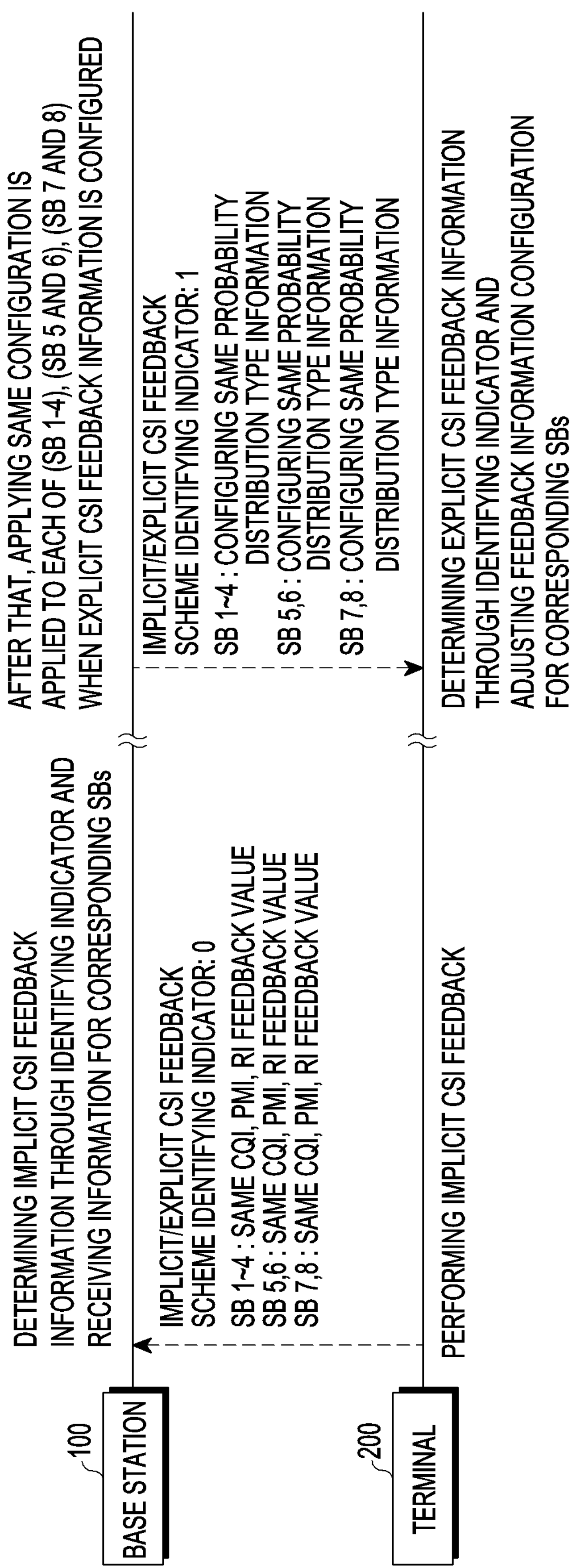
FIG. 12 is a flow diagram of a feedback information configuration and feedback operation according to a relation between implicit CSI feedback and explicit CSI feedback according to an embodiment.

FIG. 12 is a diagram of a feedback information configuration and feedback operation according to a relation between implicit CSI feedback and explicit CSI feedback according to an embodiment.

Referring to FIG. 12, the terminal 200 performs an implicit CSI feedback. The implicit CSI feedback includes an indicator configured to identify implicit/explicit CSI feedback scheme, and information indicating that SBs 1 to 4 are the same, SBs 5 and 6 are the same, and SBs 7 and 8 are the same with respect to CQI, PMI, and RI feedback values. Then, the base station 100 determines implicit CSI feedback information through the identifying indicator and receives information for the corresponding SBs. Then, when explicit CSI feedback information is configured, the base station 100 applies the same configurations to SBs 1 to 4, SBs 5 and 6, and SBs 7 and 8. Then, the base station 100 transmits, to the terminal 200, an indicator configured to identify an implicit/explicit CSI feedback scheme, and information giving an instruction to configure the same probability distribution type information to each of SBs 1 to 4, SBs 5 and 6, and SBs 7 and 8. Then, the terminal 200 determines explicit CSI feedback information through the identifying indicator and adjusts the feedback information configuration for the corresponding SBs.

The block diagram of the system exemplified in FIG. 1 is not intended to limit the scope of the present disclosure. That is, all the elements illustrated in FIG. 1, or the operations are not intended to be interpreted as essential features for carrying out the present disclosure, and only some elements thereof may implement the present disclosure without departing from the scope and spirit of the present disclosure.

The operations described above may be implemented by configuring a memory device, which stores a corresponding program code, in a random element of the base station or the terminal. That is, a controller of the base station or UE may perform the above described operations by reading and executing the program code stored in the memory device by means of a processor or a central processing unit (CPU).

The entity, the function, the base station, a load manager, various elements of the terminal, modules and the like may be operated by using a hardware circuit, e.g. a complementary metal oxide semiconductor based logic circuit, firmware, software, and/or a combination of hardware and the firmware and/or software embedded in a non-transitory machine readable recording medium. For example, various electrical configurations and methods may be carried out by using electrical circuits such as transistors, logic gates, and an application specific integrated circuit (ASIC).

In addition, in the NR-MIMO system according to various embodiments as described above, a program code configured to perform a feedback information configuring method for explicit CSI feedback may be stored in a non-transitory computer readable recording medium. A non-transitory computer readable recording medium indicates a medium which may semipermanently store data and may be read by a device, rather than a medium, such as a cache, which is a memory that stores data during a short period of time. For example, the above mentioned various applications or programs may be provided while being stored in a non-transitory computer readable recording medium, such as a compact disc (CD), a digital versatile disc (DVD), a hard disk, a Blu-ray disc, a universal serial bus (USB), a memory card, a read only memory (ROM), etc.

In addition, although embodiments of the present disclosure have been illustrated and described above, the present disclosure is not intended to be limited thereto. It will be apparent that various modified implementations may be made by those skilled in the art without departing from the scope of the present disclosure as defined by the appended claims and their equivalents, and the modified implementations should not be construed separately from the present disclosure.

What is claimed is:

1. A method for transmitting a feedback signal by a terminal in a wireless communication system, the method comprising:

receiving, from a base station, a feedback information configuration including channel component information and grouping information;

receiving, from the base station, a reference signal;

performing a channel measurement between the base station and the terminal based on the reference signal;

separating each of a plurality of channel elements of a channel obtained by the channel measurement according to components of the plurality of the channel elements based on the channel component information;

grouping the plurality of the separated channel elements of the channel based on the grouping information;

configuring order sorting information associated with sorting an order of at least one channel element included in each group of the plurality of the separated channel elements;

configuring probability distribution approximation information associated with probability distribution approximating the at least one channel element included in each group of the plurality of the separated channel elements; and transmitting feedback information including the configured order sorting information and the configured probability distribution approximation information.

2. The method of claim 1, wherein the order sorting information includes information on an original sort order.

3. The method of claim 1, wherein the probability distribution approximation information includes a probability distribution type, a probability distribution representing parameter type, and a scalar quantization range for each of probability distribution representing parameters.

4. A terminal for transmitting a feedback signal in a wireless communication system, the terminal comprising:

a wireless communication unit configured to transmit and receive data; and a control unit configured to control the terminal, wherein the control unit is further configured to:

control the wireless communication unit to receive, from a base station, a feedback information configuration including channel component information and grouping information;

control the wireless communication unit to receive, from the base station, a reference signal;

perform a channel measurement between the base station and the terminal based on the reference signal;

separate each of a plurality of channel elements of a channel obtained by the channel measurement according to components of the plurality of the channel elements based on the channel component information;

group the plurality of the separated channel elements of the channel based on the grouping information;

configure order sorting information associated with sorting an order of at least one channel element included in each group of the plurality of the separated channel elements;

configure probability distribution approximation information associated with probability distribution approximating the at least one channel element included in each group of the plurality of the separated channel elements; and control the wireless communication unit to transmit feedback information including the configured order sorting information and the configured probability distribution approximation information.

5. The terminal of claim 4, wherein the order sorting information includes information on an original sort order.

6. The terminal of claim 4, wherein the probability distribution approximation information includes a probability distribution type, a probability distribution representing parameter type, and a scalar quantization range for each of probability distribution representing parameters.

7. The method of claim 1, wherein the channel component information comprises feedback channel type information and separation channel component type information.

8. The method of claim 1, wherein the grouping information comprises information on a grouping scheme, the grouping scheme including an equal number scheme and an unequal number scheme.

9. The method of claim 1, wherein the channel component information comprises feedback channel type information and separation channel component type information.

10. The method of claim 1, wherein the grouping information comprises information on a grouping scheme, the grouping scheme including an equal number scheme and an unequal number scheme.

11. A method for restoring a channel matrix by a base station configured to perform communication through a channel in a wireless communication system, the method comprising:

transmitting, to a terminal, a feedback information configuration including channel component information and grouping information;

receiving, from the terminal, feedback information including the configured order sorting information and the configured probability distribution approximation information;

releasing probability distribution approximation of the channel comprising a plurality of channel elements based on the received probability distribution approximation information;

restoring a sort order of the plurality of the channel elements based on the received order sorting information;

releasing grouping of the plurality of channel elements based on the grouping information; and combining the plurality of channel elements based on the channel component information to restore the channel matrix.

12. The method of claim 11, wherein the channel component information comprises feedback channel type information and separation channel component type information.

13. The method of claim 11, wherein the grouping information comprises information on a grouping scheme, the grouping scheme including an equal number scheme and an unequal number scheme.

14. The method of claim 11, wherein the order sorting information includes information on an original sort order.

15. The method of claim 11, wherein the probability distribution approximation information includes a probability distribution type, a probability distribution representing parameter type, and a scalar quantization range for each of probability distribution representing parameters.

16. A base station for restoring a channel matrix to perform communication through a channel in a wireless communication system, the base station comprising:

a wireless communication unit configured to transmit and receive data; and a control unit configured to control the base station, wherein the control unit is further configured to:

control the wireless communication unit to transmit, to a terminal, a feedback information configuration including channel component information and grouping information;

control the wireless communication unit to receive, from the terminal, feedback information including the configured order sorting information and the configured probability distribution approximation information;

release probability distribution approximation of the channel comprising a plurality of channel elements based on the probability distribution approximation information;

restore a sort order of the plurality of channel elements based on the order sorting information;

release grouping of the plurality of channel elements based on the grouping information; and combine the plurality of channel elements based on the channel component information to restore the channel matrix.

17. The method of claim 11, wherein the channel component information comprises feedback channel type information and separation channel component type information.

18. The method of claim 11, wherein the grouping information comprises information on a grouping scheme, the grouping scheme including an equal number scheme and an unequal number scheme.

19. The method of claim 11, wherein the order sorting information includes information on an original sort order.

20. The method of claim 11, wherein the probability distribution approximation information includes a probability distribution type, a probability distribution representing parameter type, and a scalar quantization range for each of probability distribution representing parameters.

* * * * *